(12) United States Patent
Kawata et al.

(10) Patent No.: US 9,074,929 B2
(45) Date of Patent: Jul. 7, 2015

(54) IMAGE DISPLAY APPARATUS HAVING A LIGHT GUIDE UNIT REFRACTING INCIDENT LIGHT FROM A SCREEN TO A SENSOR

(71) Applicant: CANON KABUSHIKI KAISHA, Tokyo (JP)

(72) Inventors: Jun Kawata, Fujisawa (JP); Atsushi Morita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 13/718,229

(22) Filed: Dec. 18, 2012

(65) Prior Publication Data

US 2013/0161498 A1    Jun. 27, 2013

(30) Foreign Application Priority Data

Dec. 26, 2011 (JP) .................................. 2011-283560
Nov. 26, 2012 (JP) .................................. 2012-257593

(51) Int. Cl.

| H01L 27/00 | (2006.01) |
| G01J 1/04 | (2006.01) |
| G01J 1/32 | (2006.01) |
| G09G 3/36 | (2006.01) |
| G01J 3/50 | (2006.01) |
| G09G 3/00 | (2006.01) |

(52) U.S. Cl.
CPC ............. *G01J 1/0425* (2013.01); *G01J 1/0422* (2013.01); *G01J 1/32* (2013.01); *G01J 3/506* (2013.01); *G01J 1/0474* (2013.01); *G09G 3/006* (2013.01); *G09G 3/36* (2013.01); *G09G 2320/0233* (2013.01); *G09G 2320/0242* (2013.01); *G09G 2320/041* (2013.01); *G09G 2320/0693* (2013.01); *G09G 2360/145* (2013.01)

(58) Field of Classification Search
CPC .............. G02F 2001/133607; G02F 1/133606; G02F 1/133502; G01F 3/506; G01J 1/0422; G02J 1/0425
USPC .............. 250/208.1, 227.11, 227.2, 205, 239, 250/559.1; 349/65, 69, 112; 345/212, 204, 345/207, 214
See application file for complete search history.

(56) References Cited

U.S. PATENT DOCUMENTS

| 8,743,101 B2 * | 6/2014 | Kaji et al. ..................... 345/207 |
| 2008/0198297 A1 | 8/2008 | Choi et al. |
| 2010/0085506 A1 | 4/2010 | Kim et al. |

FOREIGN PATENT DOCUMENTS

| CN | 101042499 A | 9/2007 |
| JP | 04-053923 | 2/1992 |
| JP | 2005-208548 | 8/2005 |

(Continued)

OTHER PUBLICATIONS

The above references were cited in an Oct. 10, 2014 Chinese Office Action, which is enclosed with an English Translation, that issued in Chinese Patent Application No. 201210576400.8.

*Primary Examiner* — Que T Le
(74) *Attorney, Agent, or Firm* — Cowan, Liebowitz & Latman, P.C.

(57) ABSTRACT

An image display apparatus according to the present invention, comprises: a display panel displaying an image on a screen; and a photometric unit measuring light incident from the screen, wherein the photometric unit includes: a sensor measuring the incident light; and a light guide unit refracting the incident light and guiding the refracted light to the sensor.

19 Claims, 20 Drawing Sheets

(56) References Cited

FOREIGN PATENT DOCUMENTS

| | | |
|---|---|---|
| JP | 2009-069327 A | 4/2009 |
| JP | 2010-008882 | 1/2010 |
| JP | 2011-048191 A | 3/2011 |
| JP | 2011-133583 A | 7/2011 |
| KR | 2007-0025052 A | 3/2007 |
| KR | 2008-0089008 A | 10/2008 |
| KR | 2009-0034580 A | 4/2009 |

* cited by examiner

FIG. 1
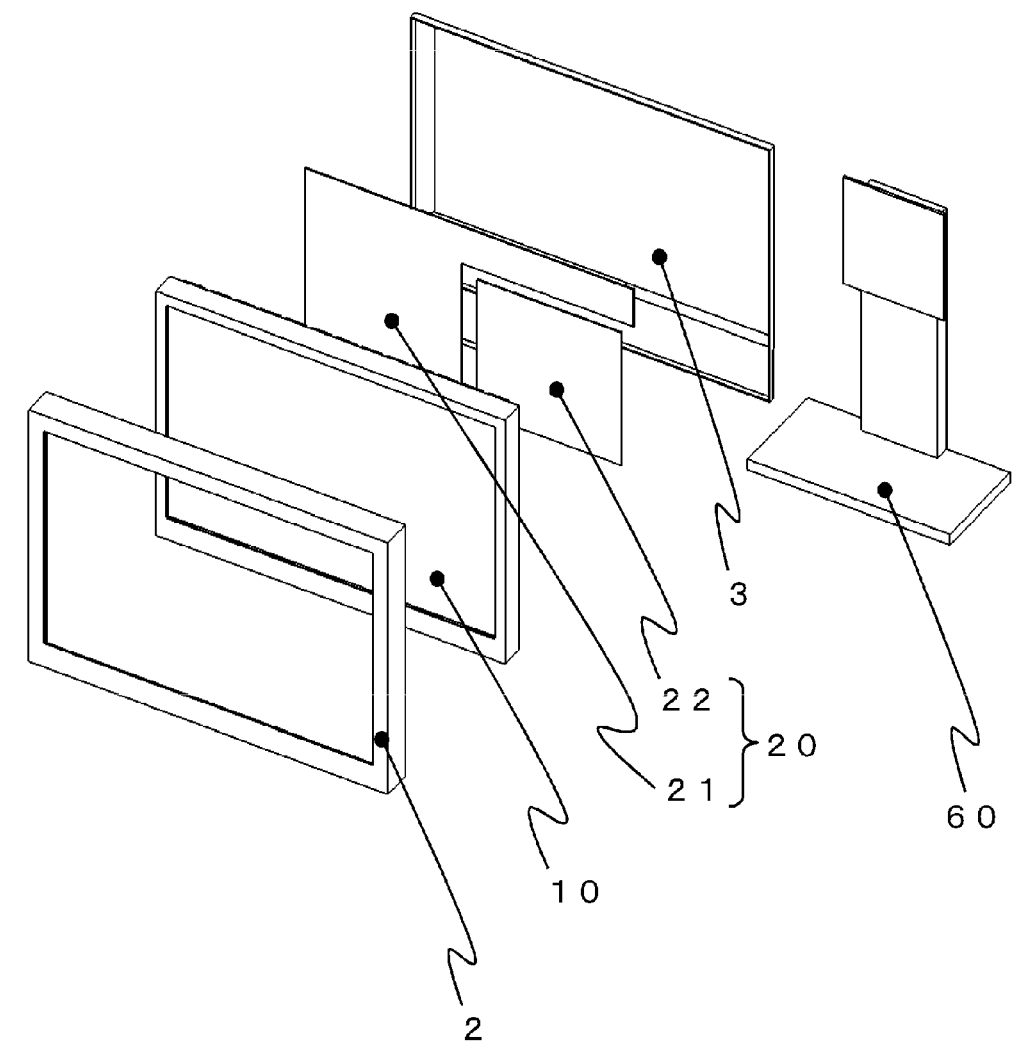
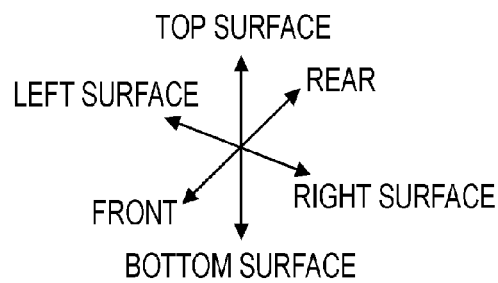

FIG. 3
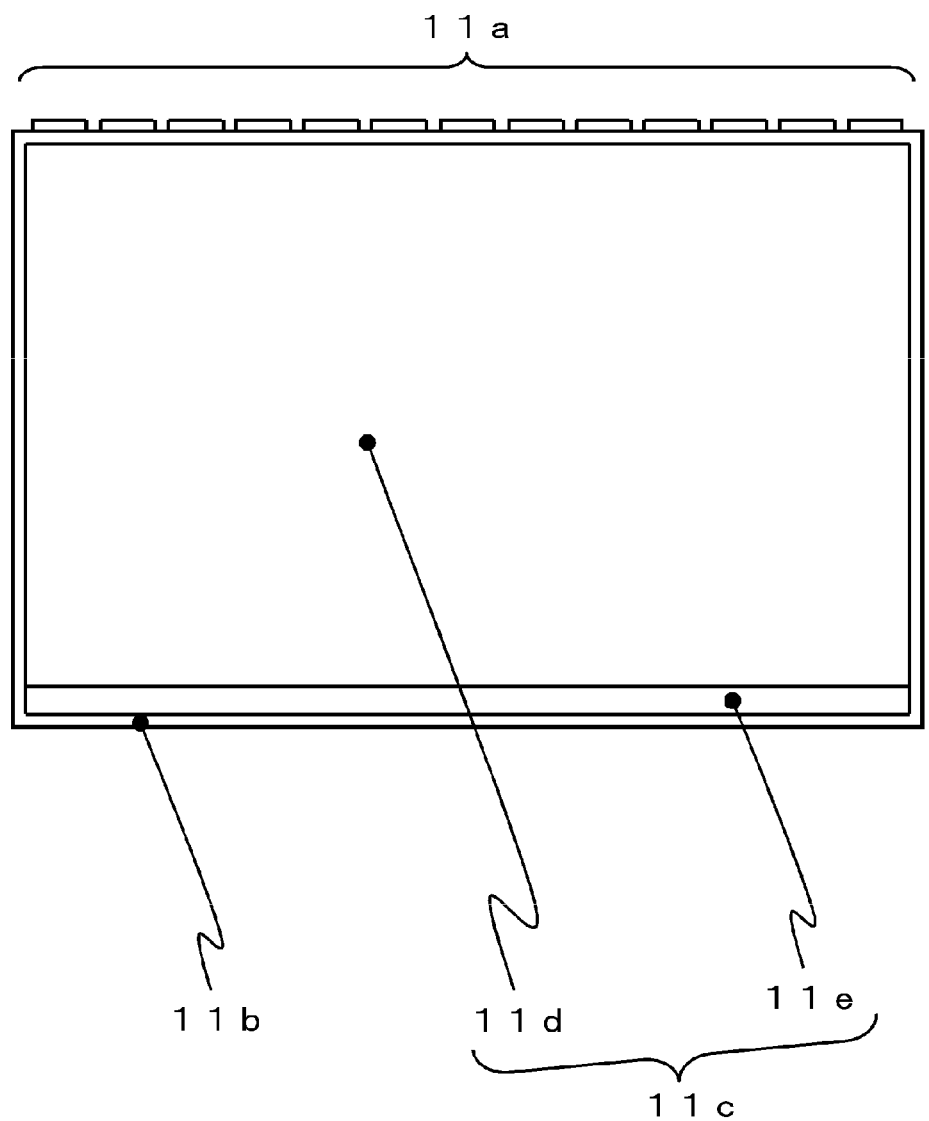
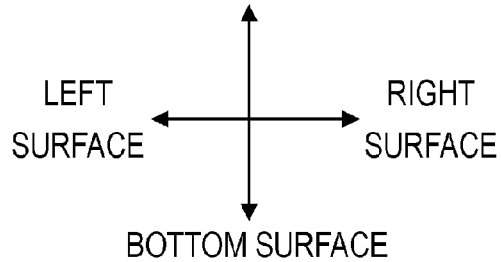

FIG. 5
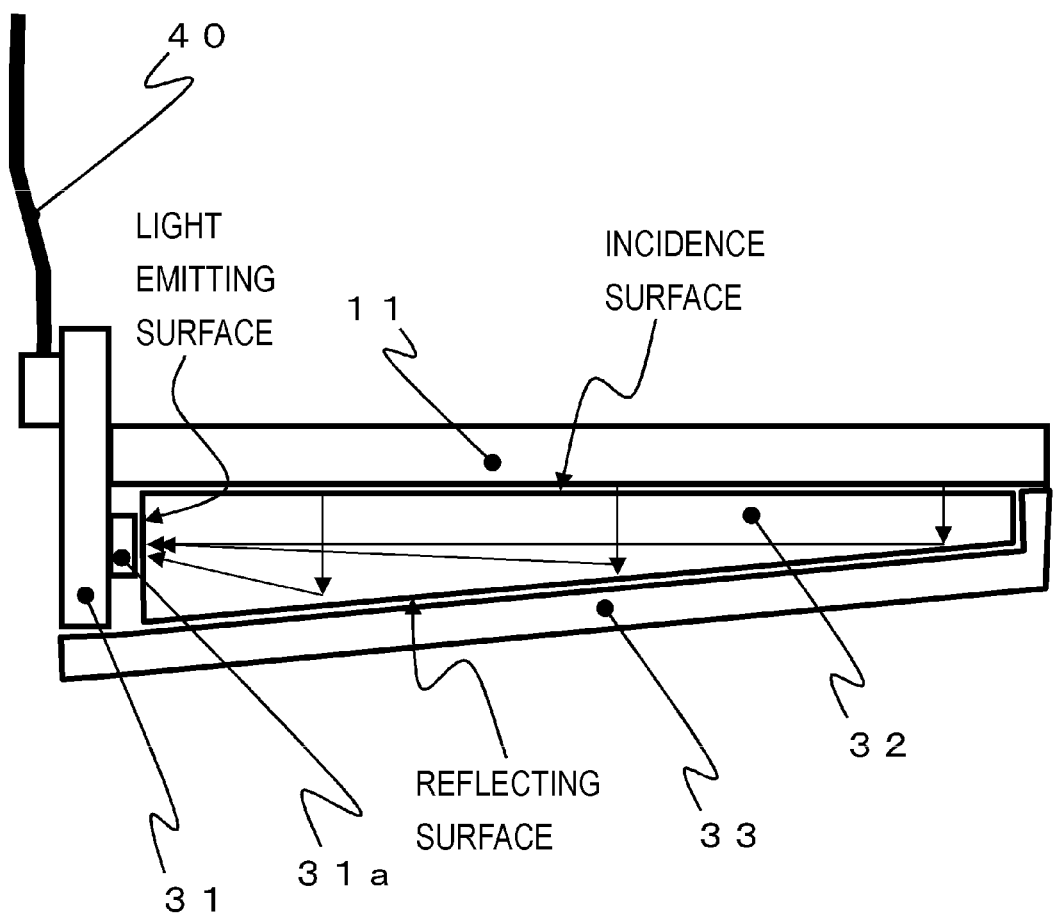
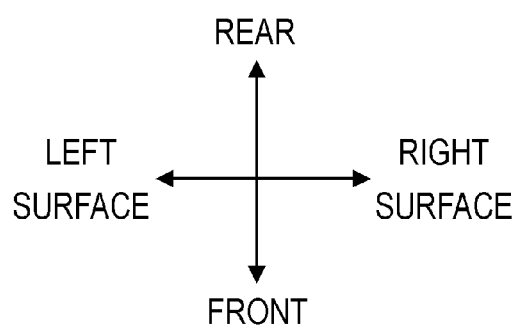

FIG. 8
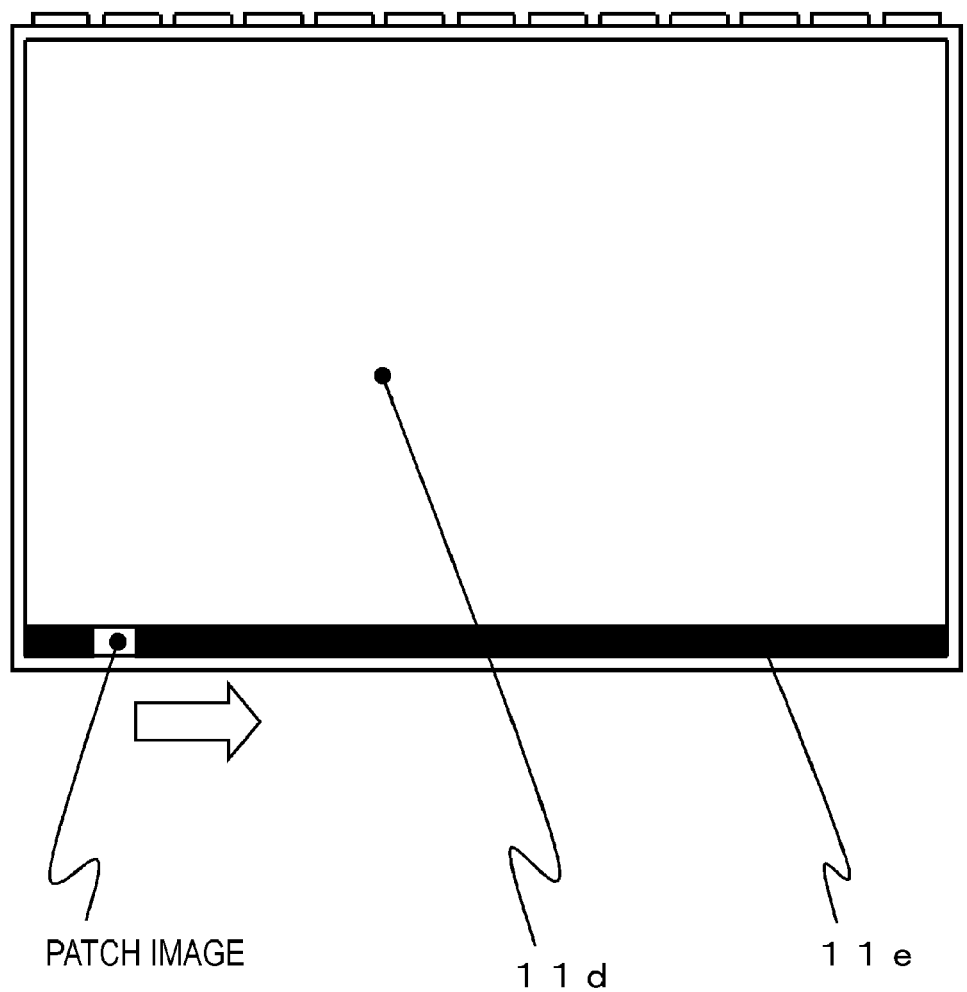
PATCH IMAGE   11d   11e
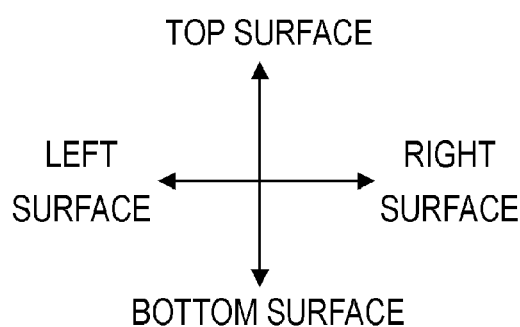

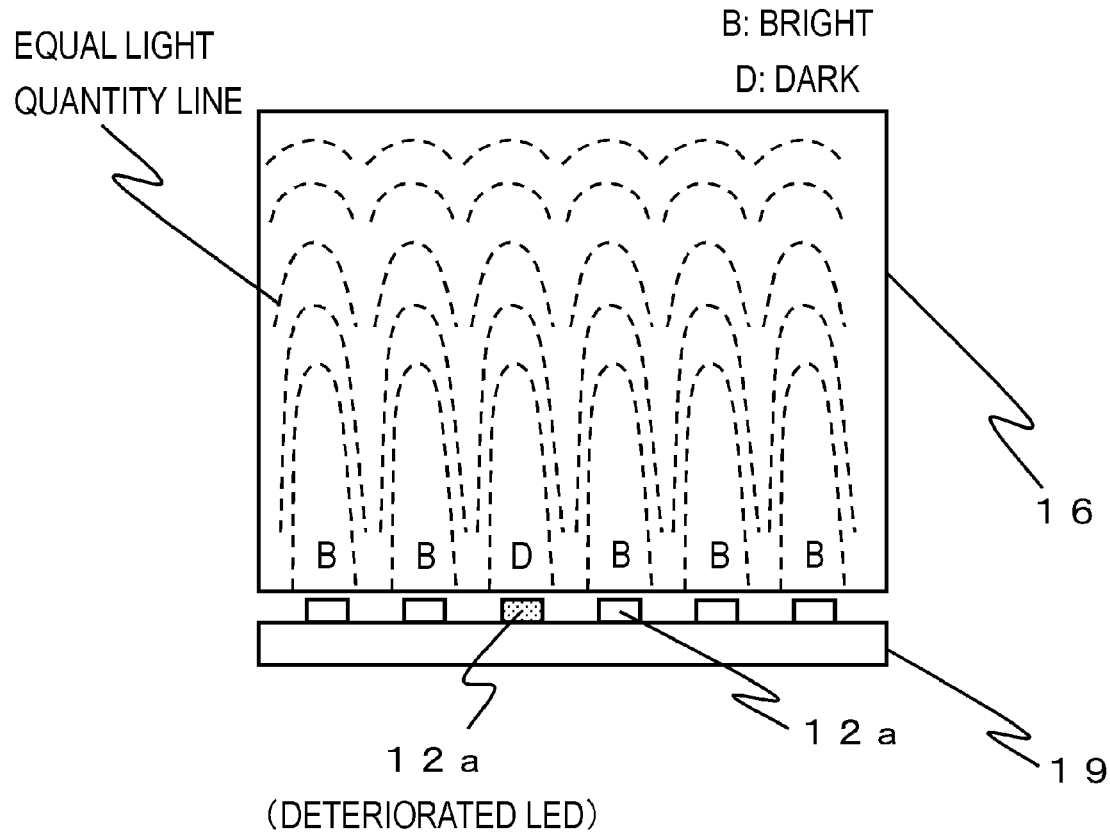
FIG. 10B
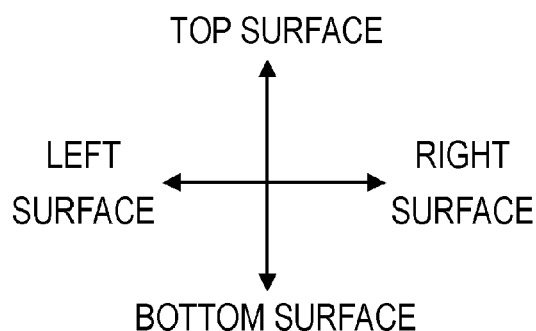

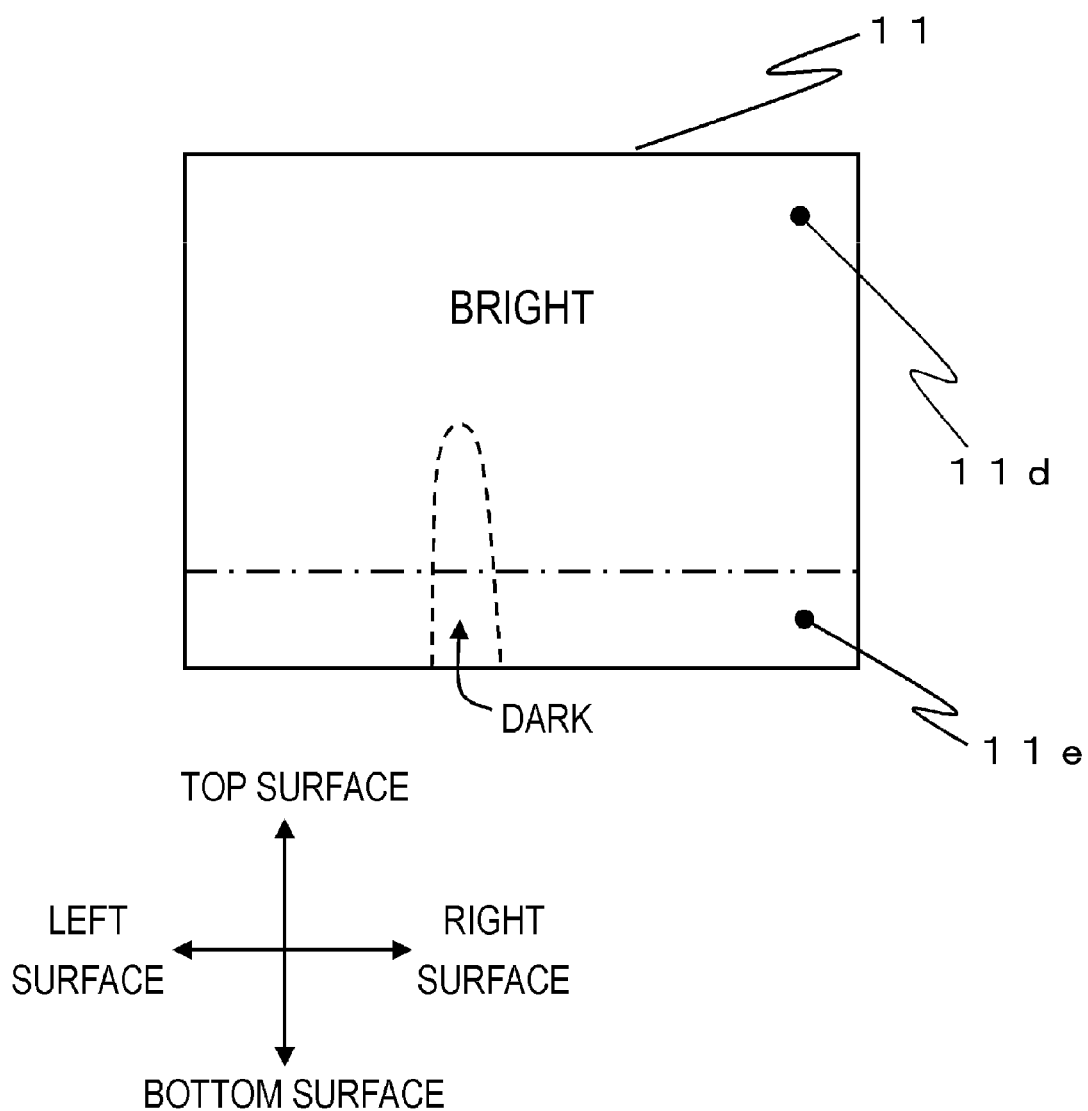

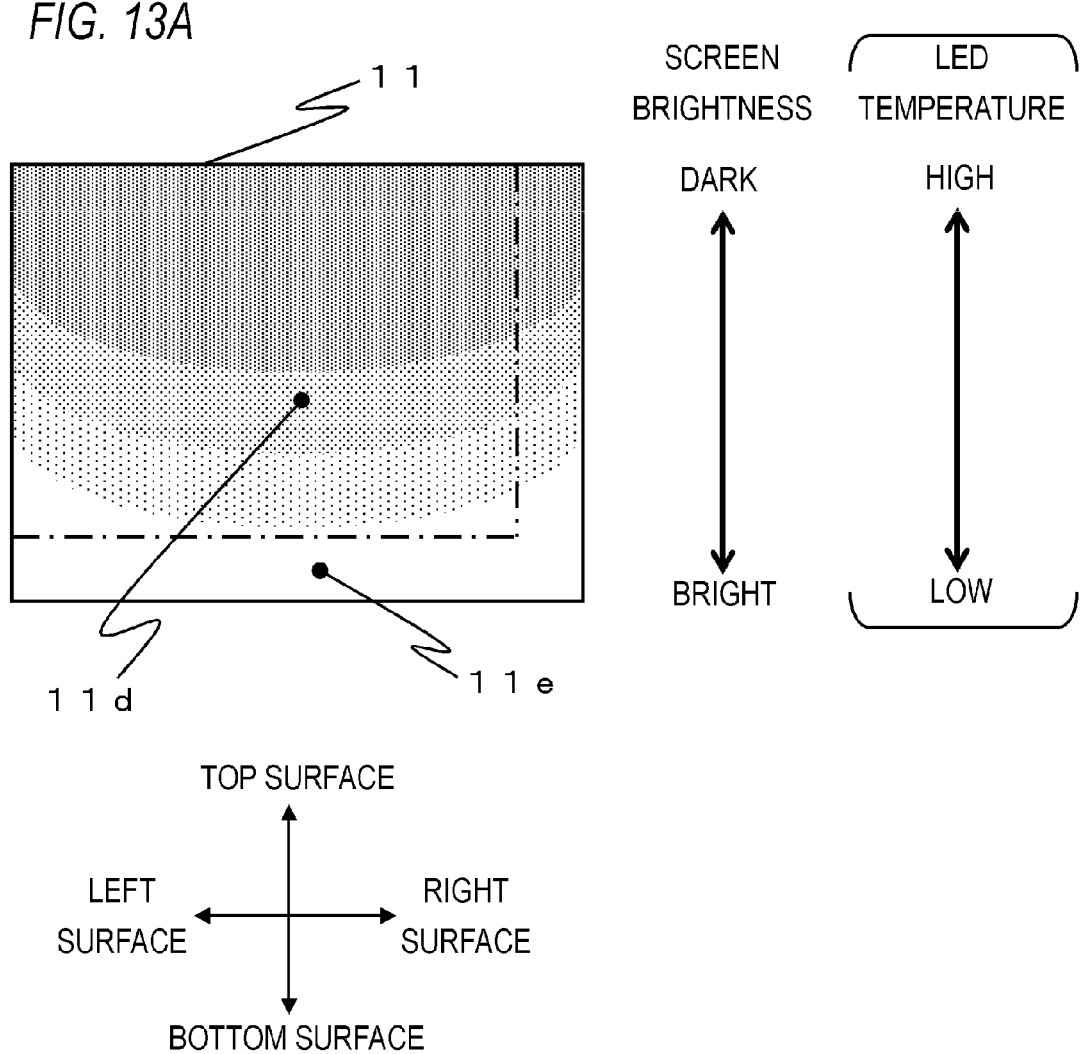

FIG. 13B
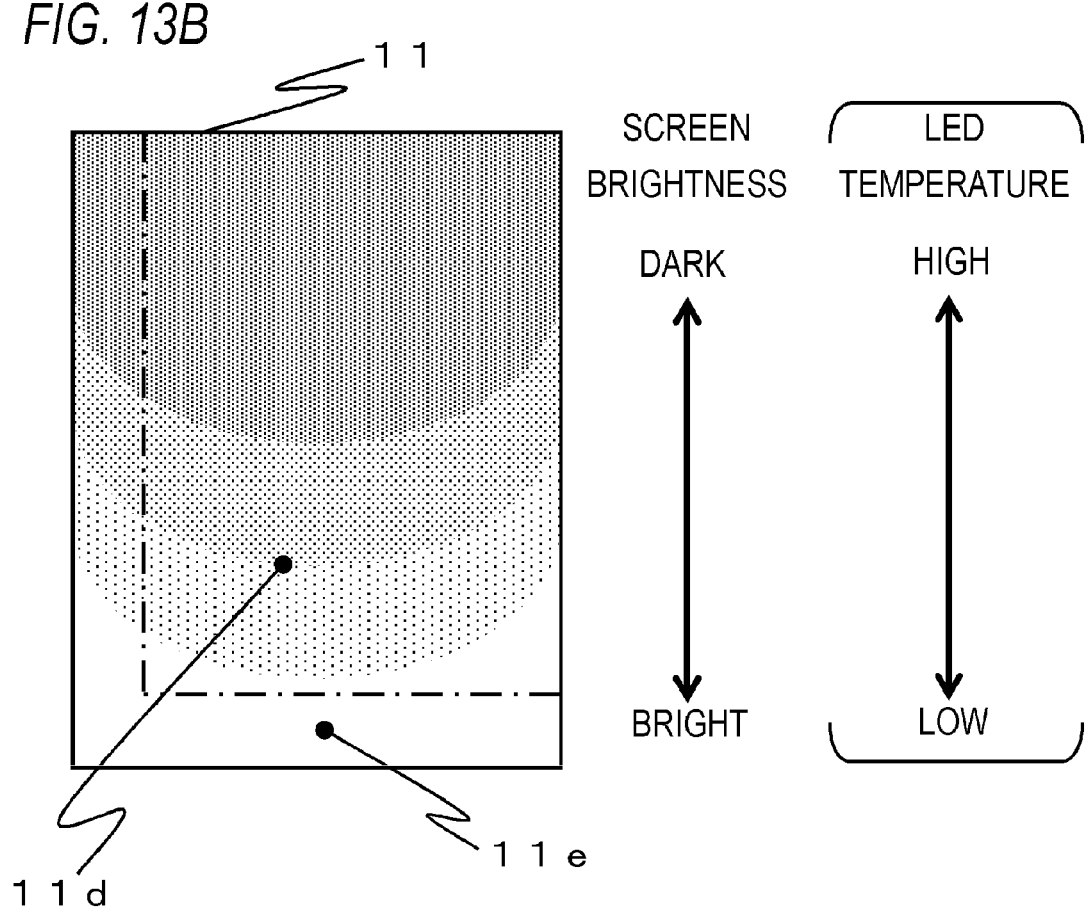
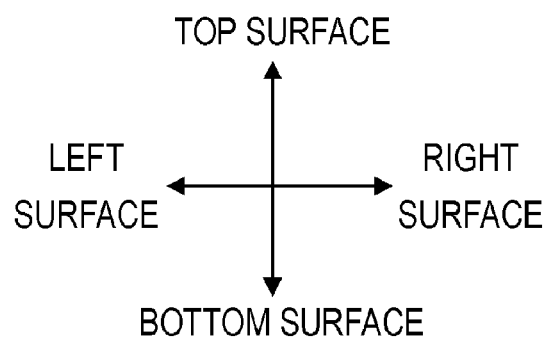

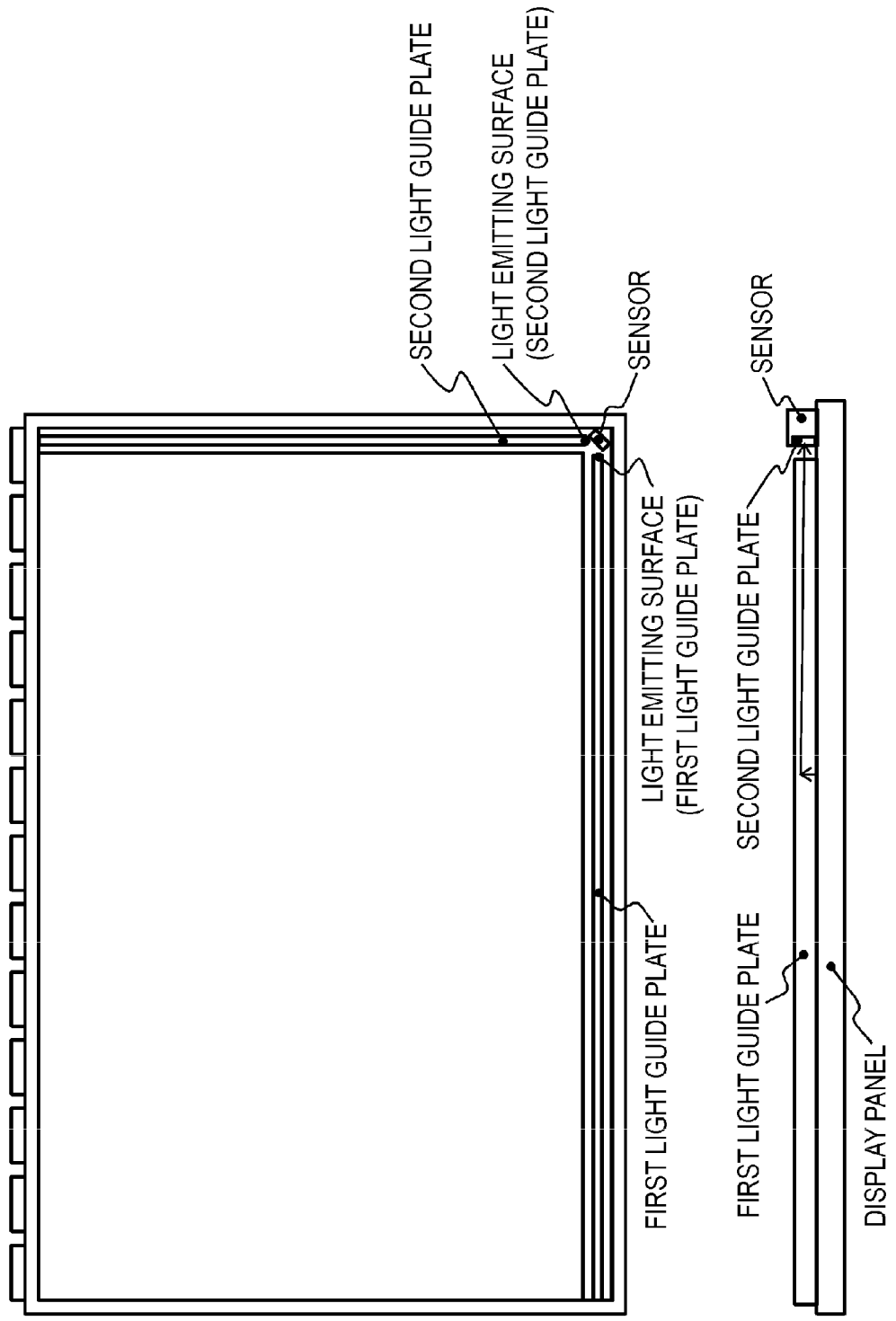

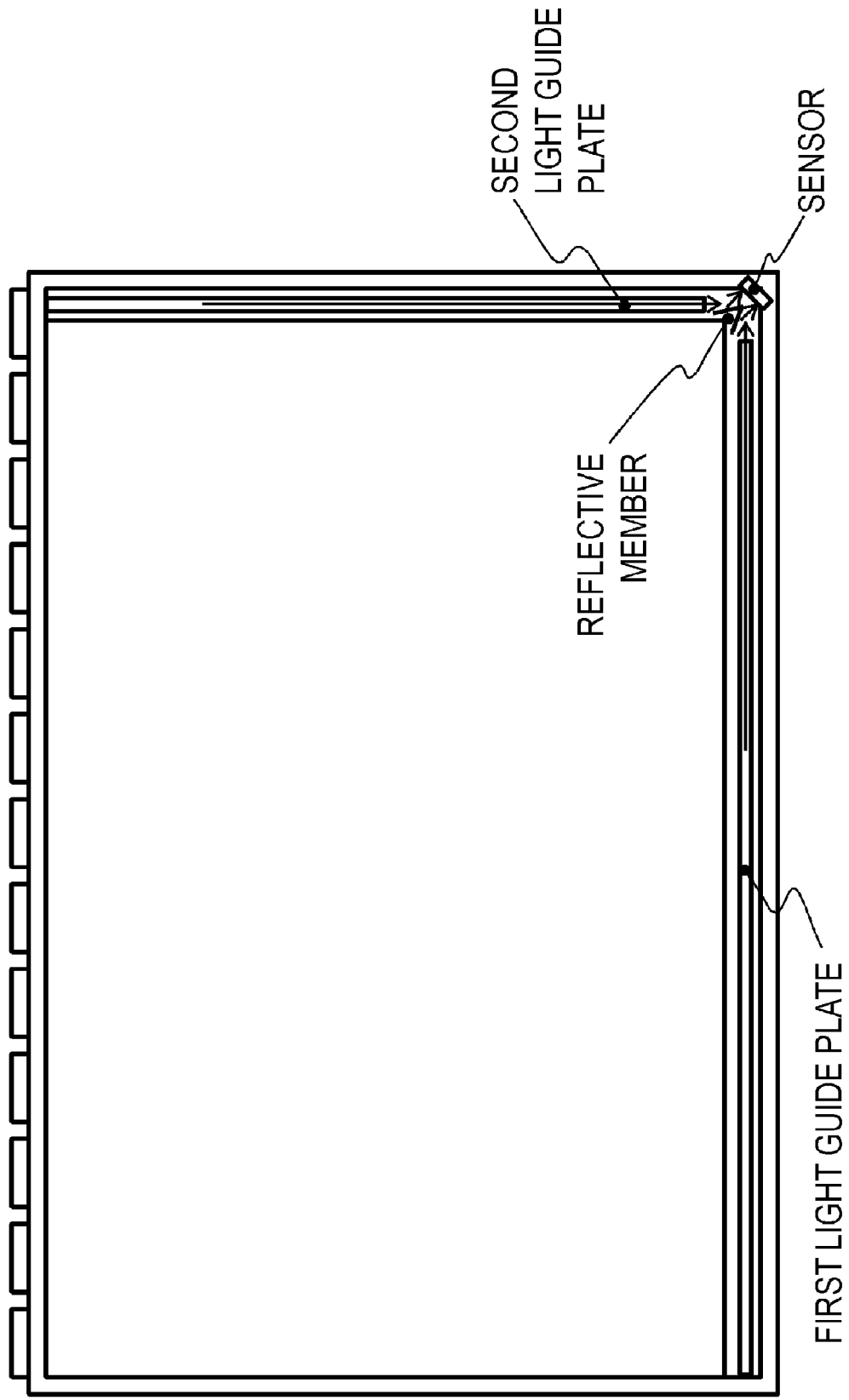

IMAGE DISPLAY APPARATUS HAVING A LIGHT GUIDE UNIT REFRACTING INCIDENT LIGHT FROM A SCREEN TO A SENSOR

BACKGROUND OF THE INVENTION

1. Field of the Invention

The present invention relates to an image display apparatus.

2. Description of the Related Art

Recently, an image display apparatus having display panels, such as a panel having a liquid crystal panel and a backlight, and an organic electroluminescence (EL) panel, and the like, has been used for various purposes. In particular, an image display apparatus used for printing or medical industries, and the like, needs to reproduce colors and therefore, is released in a state in which image quality parameters (brightness, chromaticity, and the like) or uniformity characteristics are calibrated. However, the display panel is deteriorated over time due to installation environment, temperature, and the like, of the image display apparatus and therefore, the image quality parameters are changed. For this reason, the image display apparatus requires periodic calibration processing (processing that measures light from a screen using a photometric sensor and corrects the image quality parameters based on the measured value). It is possible to continuously perform a desired color reproduction display by periodically perform calibration processing. Further, in the calibration processing, the screen is partially covered by the photometric sensor so as to measure light from the screen. In the related art, an image display apparatus having a movable photometric sensor that is hidden in an exterior case when not performing photometry and moves on a screen when performing photometry has been proposed (Japanese Patent Application Publication No. 2005-208548).

Hereinafter, the image display apparatus disclosed in Japanese Patent Application Publication No. 2005-208548 will be described with reference to FIG. 17.

FIG. 17 is a front view of the image display apparatus disclosed in Japanese Patent Application Publication No. 2005-208548.

An image display apparatus 301 has a structure in which a display panel 302 displaying an image is accommodated in an exterior case configured of a bezel 303 and a rear cover. The bezel 303 is provided with an opening 303a having approximately the same dimensions and approximately the same shape as the screen of the display panel 302. The screen of the display panel 302 is exposed by the opening 303a. A front sensor unit 304 including a photometric sensor is disposed in the vicinity of a corner of the opening 303a. The front sensor unit 304, which is a movable type, can be rotated in the vicinity of a corner of the bezel 303. The photometric sensor is disposed on the screen of the display panel 302 when performing the photometry and is accommodated in the bezel 303 when not performing the photometry.

SUMMARY OF THE INVENTION

As described above, in the image display apparatus disclosed in Japanese Patent Application Publication No. 2005-208548, the photometric sensor is disposed on the screen only when performing photometry. For this reason, in the image display apparatus disclosed in Japanese Patent Application Publication No. 2005-208548, a viewing of a user is not disturbed by the photometric sensor unless the photometry is performed.

However, in the image display apparatus according to the related art that includes the image display apparatus disclosed in Japanese Patent Application Publication No. 2005-208548, light from a local area on the screen is measured by the photometric sensor. In the case of a configuration that measures light from the local area, there is a case in which undesirable measured values are obtained due to the usage environment of the image display apparatus, and the like.

For example, when dust, and the like, sticks to the local area, incorrect measured values are obtained. When performing the calibration processing based on the measured values, the desired color reproduction display cannot be performed.

Further, when the temperature of the local area is largely different from that of other areas due to the surrounding environment of the image display apparatus, and the like, the display characteristics of the display panel in the local area are different from those in other areas. For this reason, the measured values of light that is largely different from light from the area other than the local area on the screen are obtained. When performing the calibration processing based on the measured values, the desired color reproduction display cannot be performed in the area other than the local area on the screen.

The present invention provides an image display apparatus capable of measuring light from a screen with high precision.

An image display apparatus according to the present invention, comprises:

a display panel displaying an image on a screen; and a photometric unit measuring light incident from the screen, wherein the photometric unit includes:

a sensor measuring the incident light; and a light guide unit refracting the incident light and guiding the refracted light to the sensor.

According to the present invention, it is possible to measure light from a screen with high precision.

Further features of the present invention will become apparent from the following description of exemplary embodiments with reference to the attached drawings.

BRIEF DESCRIPTION OF THE DRAWINGS

FIG. 1 is an exploded view of an image display apparatus according to a first embodiment;

FIG. 3 is a front view of a liquid crystal panel according to the first embodiment;

FIG. 5 is a cross-sectional view of the front sensor unit according to the first embodiment;

FIG. 8 is a front view of a liquid crystal panel according to the second embodiment;

FIGS. 10A and 10B are diagrams illustrating a quantity of light of each LED according to the second embodiment;

FIGS. 11A and 11B are diagrams illustrating brightness distribution on a screen according to the second embodiment;

FIGS. 13A and 13B are diagrams illustrating brightness distribution on a screen according to the third embodiment;

FIG. 14 is a schematic diagram illustrating another liquid crystal panel according to the third embodiment;

FIG. 15 is a schematic diagram illustrating another liquid crystal panel according to the third embodiment;

DESCRIPTION OF THE EMBODIMENTS

First Embodiment

Figure 2:
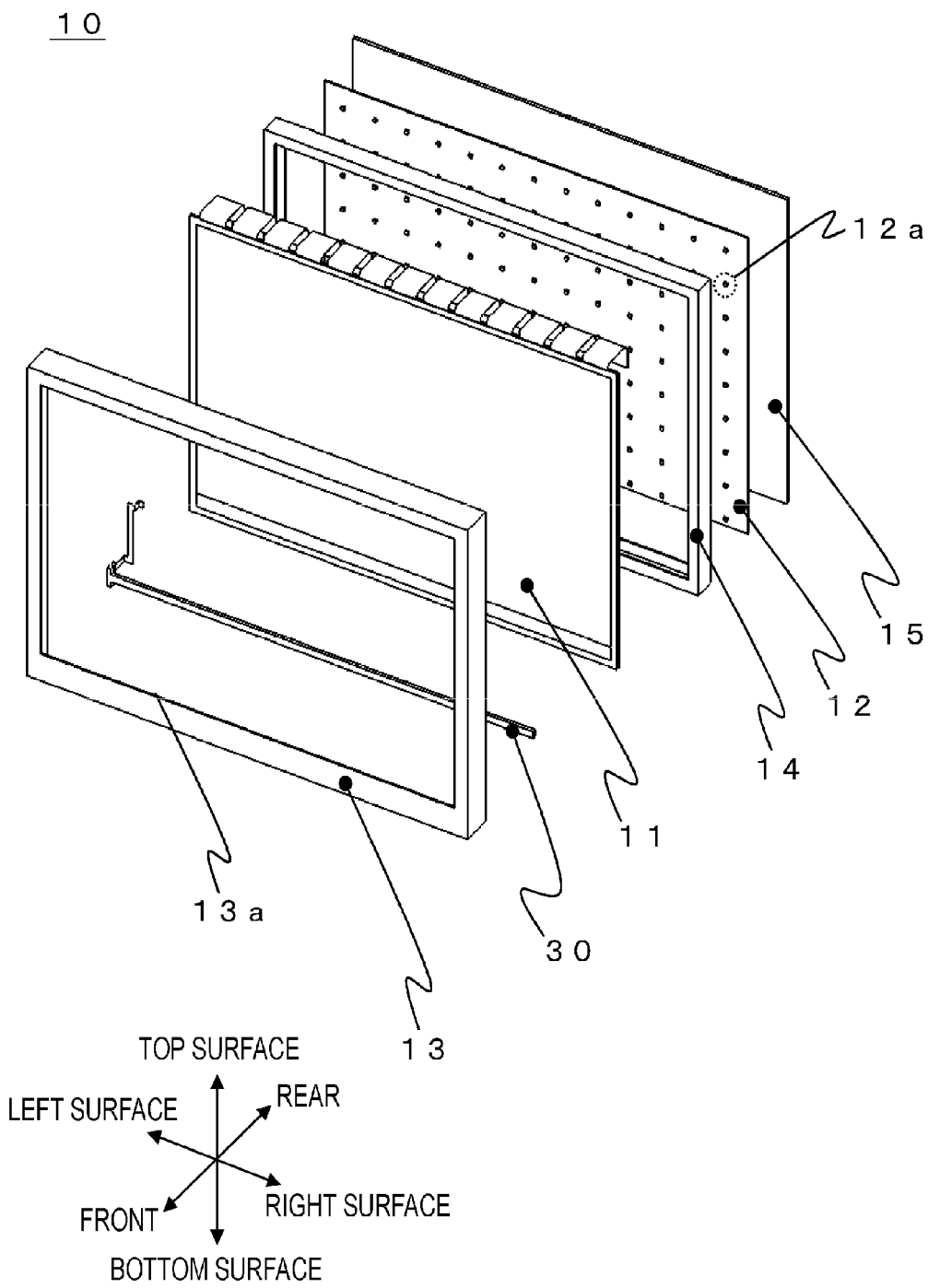
FIG. 2 is an exploded view of a display module according to the first embodiment.

Hereinafter, an image display apparatus according to a first embodiment of the present invention will be described with reference to the drawings.

First, a structure of the image display apparatus according to the first embodiment will be described with reference to FIG. 1. FIG. 1 is an exploded view of the image display apparatus according to the first embodiment.

An image display apparatus 1 has a structure in which a display module 10 and a circuit board group 20 disposed at a rear side of the display module 10 are accommodated in an exterior case configured of a bezel 2 and a rear cover 3. The bezel 2 is disposed at a front of the display module 10 and the rear cover 3 is disposed at the rear side of the display module 10 and the circuit board group 20. The circuit board group 20 includes a system board 21 that perform image processing, and the like, on an input image signal and a power board 22 that supplies power to the display module 10, the system board 21, and the like. The image display apparatus 1 is supported from a rear thereof by a stand 60 or a clasp for hanging on walls (not illustrated).

Next, a structure of the display module 10 will be described with reference to FIGS. 2 and 3. FIG. 2 is an exploded view of the display module 10. FIG. 3 is a front view of a liquid crystal panel 11.

The display module 10 has a structure in which a backlight board 12 as a backlight is disposed on a rear side of the liquid crystal panel 11. The liquid crystal panel 11 has a plurality of liquid crystal elements of which transmittance is controlled based on an image signal. A surface of the backlight board 12 is provided with a plurality of light emitting diodes (hereinafter, LEDs) 12a at an approximately equidistance. Light from the backlight board 12 (a plurality of LEDs 12a) transmits the liquid crystal panel 11 to display an image. That is, the display panel is configured of the liquid crystal panel 11 and the backlight board 12. Hereinafter, in the display panel (specifically, the liquid crystal panel 11), a surface on which an image is displayed is referred to as a screen. The liquid crystal panel 11 has a rectangular screen.

The liquid crystal panel 11 has a structure in which liquid crystal elements (liquid crystal material) are inserted between two sheets of glass boards. An edge of the liquid crystal panel 11 is provided with a flexible wiring board 11a on which a driving IC is mounted. The liquid crystal panel 11 is connected with the system board 21 via the flexible wiring board 11a. Further, the liquid crystal panel 11 has a side wall 11b disposed therearound so that the inside of the liquid crystal panel 11 is in an airtight state or wiring is made. Further, when viewing the liquid crystal panel 11 from the front, a screen is disposed in an inner side of the side wall 11b. An area 11c of the screen includes a first display area 11d that is a rectangular area in which any image is displayed and a second display area 11e which is adjacent to an edge of the first display area 11d and on which a predetermined image displayed. The predetermined image is, for example, a patch image, a pattern image, and the like, for performing calibration processing (processing that measures light from a screen using a photometric sensor and calibrates image quality parameters of a display panel (brightness, chromaticity, and the like), based on the measured values). Further, the area 11c of the screen may include an area other than the first display area 11d and the second display area 11e. The area 11c of the screen may include only the first display area 11d.

The liquid crystal panel 11 is held by being inserted between a front case 13 and a rear case 14 which are frame bodies. The front case 13 is provided with an opening 13a having approximately the same dimensions and approximately the same shape as the first display area 11d. Further, the bezel 2 has a similar opening. By these openings, the first display area 11d of the screen is exposed. The dimension or the shape of the opening is not limited thereto. The opening may have the same dimension and the same shape as the overall area of the screen. The opening of the front case 13 and the opening of the bezel 2 may have different dimensions or shapes.

A front sensor unit (photometric unit) 30 that measures light from the screen is disposed between the liquid crystal panel 11 and the front case 13. The front sensor unit 30 has a measuring surface that is a surface to which measured light is incident, and the front sensor unit 30 is provided so that the measuring surface faces the screen. In the first embodiment, the front sensor unit 30 is disposed so that the measuring surface faces the second display area 11e of the screen. The measuring surface is disposed along one edge of the screen (in the first embodiment, an edge of a bottom surface). Further, a length of the measuring surface in a direction along an edge of the above-mentioned screen is approximately the same length as the edge. The detailed structure of the front sensor unit will be described below in detail.

Further, the backlight board 12 is held from a rear thereof by a chassis 15. By the liquid crystal panel 11, the front case 13, the rear case 14, and the chassis 15, the inside of the display module 10 is sealed, and light from the outside is shielded on a surface other than a surface (screen) at a front of the display module 10. Although not illustrated, optical members, such as a diffusing plate, a prism sheet, and the like, are disposed between the liquid crystal panel 11 and the backlight board 12. With such a configuration, light emitted from the backlight board is uniformly irradiated to the rear (an area corresponding to the area 11c of the screen) of the liquid crystal panel 11.

Figure 4:
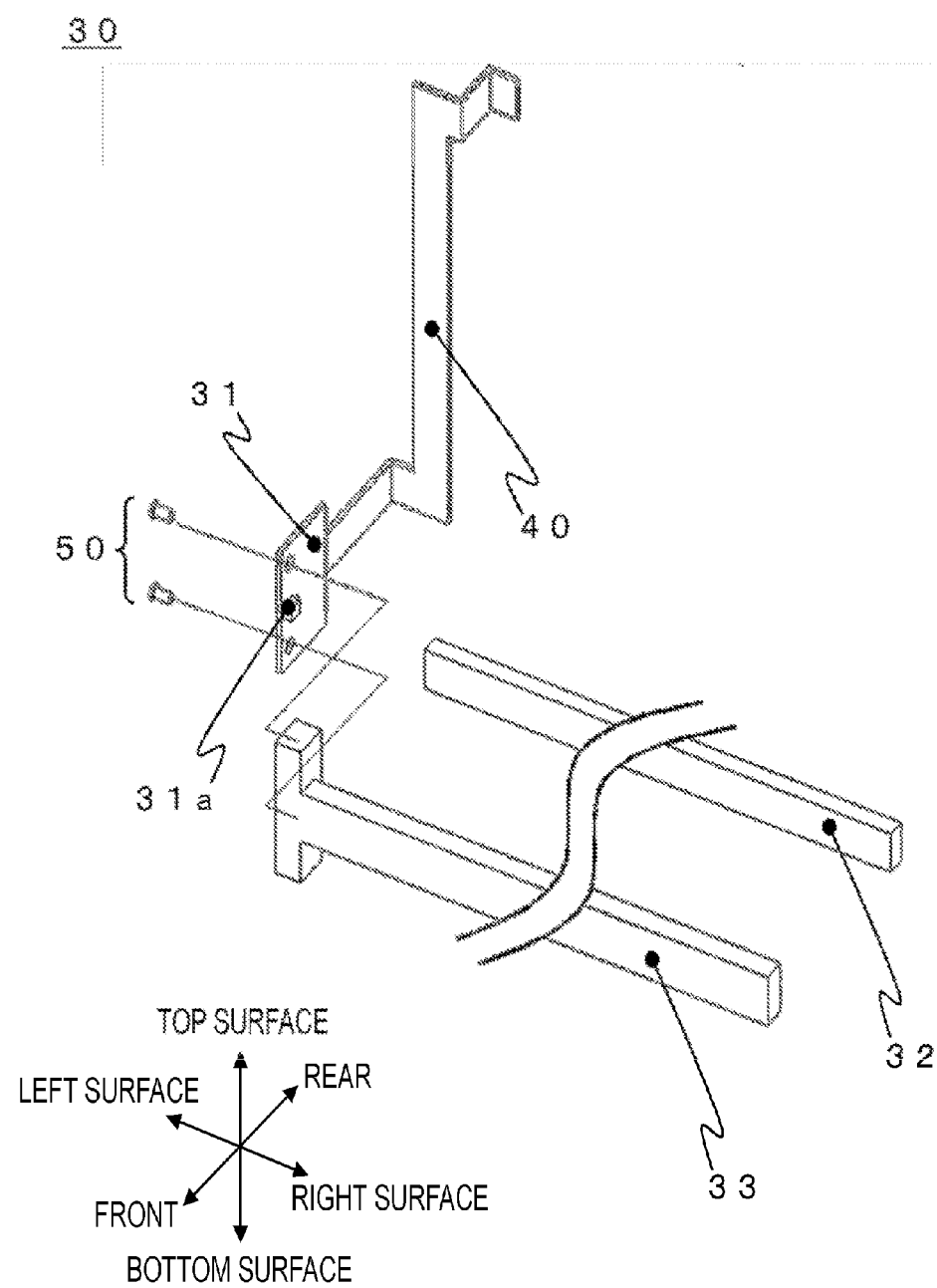
FIG. 4 is an exploded view of a front sensor unit according to the first embodiment.

Next, a structure of the front sensor unit 30 will be described with reference to FIGS. 4 and 5. FIG. 4 is an exploded view of the front sensor unit 30. FIG. 5 is a cross-sectional view of the front sensor unit 30 obtained by a surface which is vertical to the screen and parallel to an edge of a side on which the measuring surface is provided.

The front sensor unit 30 includes a sensor board 31 on which a photometric sensor 31a is mounted, a light guide plate 32 that refracts light from the screen of the liquid crystal panel 11 and guides the refracted light to the photometric sensor 31a, and a cover 33 that holds the sensor board 31 and the light guide plate 32. Further, the sensor board 31 (photometric sensor 31a) is connected with the system board 21 via a connection cable 40.

The photometric sensor 31a is a photo sensor configured of, for example, a photodiode and can measure a light quantity of wavelengths of red, green, and blue of light that is incident to a light receiving surface. In the first embodiment, the photometric sensor 31a measures light emitted from a light emitting surface of the light guide plate 32.

The light guide plate 32 has an incidence surface that is a measuring surface and a light emitting surface that emits light incident to the incidence surface to the outside. As described above, the incidence surface (measuring surface) faces the second display area of the screen. Further, the light emitting surface faces the photometric sensor 31a (specifically, the light receiving surface of the photometric sensor 31a).

Further, in the first embodiment, surfaces other than the incidence surface and the light emitting surface of the light guide plate 32 are formed of a reflecting surface that reflects the irradiated light. In the first embodiment, the reflecting surfaces are inclined to the light emitting surface and reflect light incident to the incidence surface toward the light emitting surface. With such a configuration, it is possible to suppress a variation in loss until light incident to each position of the incidence surface reaches the light emitting surface.

In addition, in the first embodiment, a diffusing agent is added to the inside of the light guide plate. A concentration of the diffusing agent is set to be higher as the diffusing agent is farther away from the photometric sensor 31a. With such a configuration, it is possible to suppress a variation in loss until light incident to each position of the incidence surface reaches the light emitting surface.

Further, as a material of the light guide plate 32, any material transmitting light may be used and a milk-white resin material, and the like, may be used.

Note that, in the first embodiment, the light guide plate 32 has a square pillar shape, but the shape of the light guide plate is not limited thereto. As long as the light incident to the incidence surface is emitted from the light emitting surface, any shape may be used. For example, a surface (for example, the reflecting surface) of a part of the light guide plate 32 may be curved.

The cover 33 supports the light guide plate 32 and the sensor board 31. Specifically, the light guide plate 32 is bonded to the cover 33 using an adhesive or a double-sided adhesive tape. A method for supporting the light guide plate 32 is not limited thereto. For example, the light guide plate 32 may be hot-melt-adhered to the cover 33. The sensor board 31 is fixed to the cover 33 by using screws 50. Further, the cover 33 covers the circumference of the light guide plate 32 (specifically, the reflecting surface of the light guide plate 32) and the sensor board 31 (specifically, the photometric sensor 31a). With such a configuration, the external light to the front sensor unit 30 is shielded.

Figure 6:
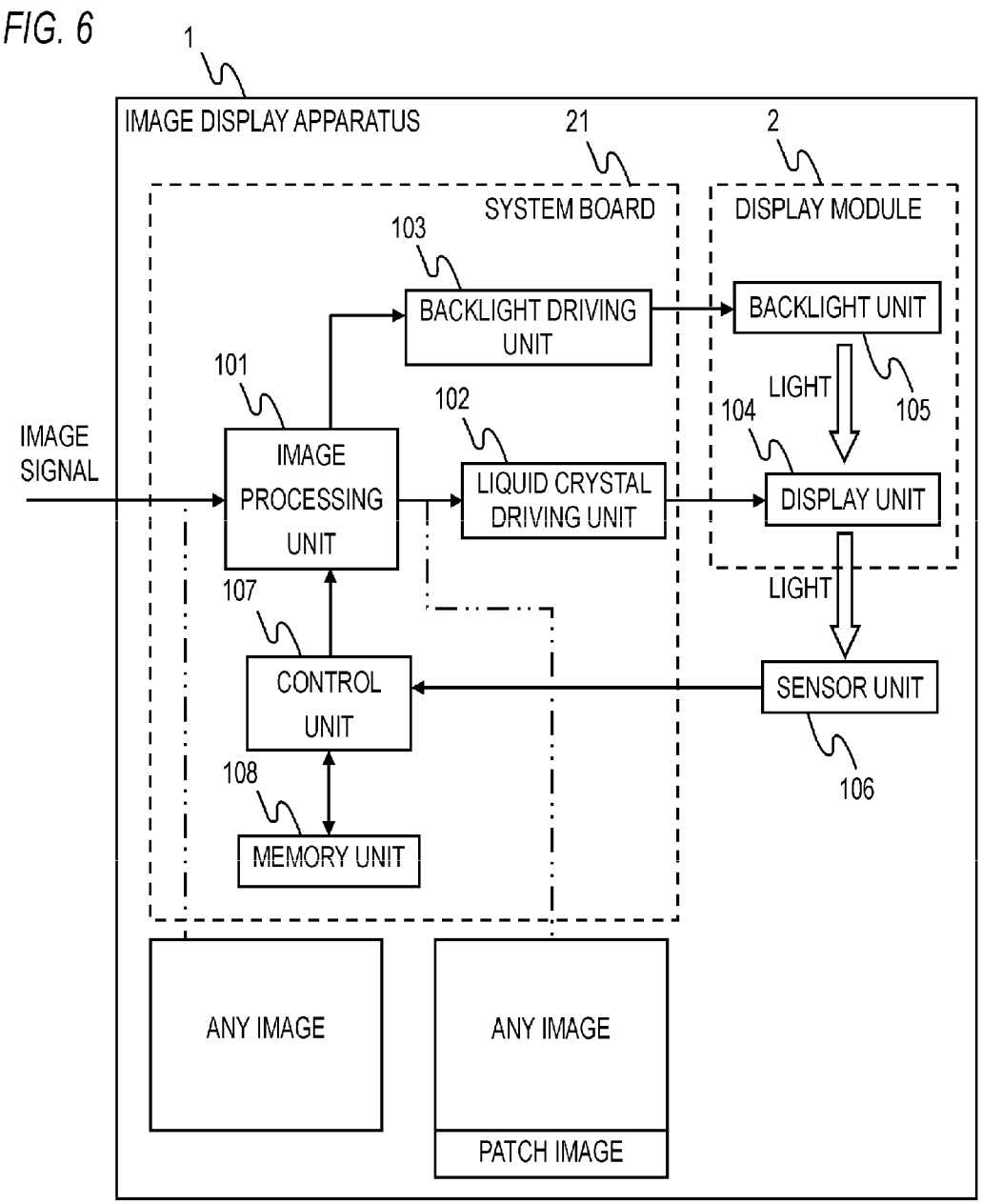
FIG. 6 is a block diagram illustrating a configuration of the image display apparatus according to the first embodiment.

Next, the calibration processing by the image display apparatus according to the first embodiment will be described with reference to FIG. 6. FIG. 6 is a block diagram illustrating a configuration of the image display apparatus according to the first embodiment.

As illustrated in FIG. 6, the image display apparatus 1 includes an image processing unit 101, a liquid crystal driving unit 102, a backlight driving unit 103, a display unit 104, a backlight unit 105, a sensor unit 106, a control unit 107, a memory unit 108, and the like. The display unit 104 is the foregoing liquid crystal panel 11, the backlight unit 105 is the foregoing backlight board 12, and the sensor unit 106 is the foregoing photometric sensor 31a.

The image processing unit 101 performs image processing on the image signal (input image signal; any image signal) input from a personal computer (hereinafter, "PC"), and the like. Specifically, the image processing is performed on the input image signal so that the brightness and/or the chromaticity of the displayed image (the image based on the input image signal) are desired values. Further, a patch image signal (a predetermined image signal) is added to the input image signal so that the patch image is displayed in the second display area 11e of the liquid crystal panel 11. The patch image is an image required to perform calibration processing. In the first embodiment, since the patch images of multiple colors are sequentially displayed over the second display area 11e, the image processing unit 101 adds the patch image signal of one color to the input image signal. However, the first embodiment is not limited to the above configuration. The plurality of patch image signals may be added to the input image signals so that the plurality of patch images having different colors are simultaneously displayed in the second display area 11e. The displayed patch image may be one type. The image processing unit 101 outputs the input image signal (added with the patch image signal), having subjected to the image processing, to the liquid crystal driving unit 102 and the backlight driving unit 103.

The liquid crystal driving unit 102 controls the transmittance of the display unit 104 (each liquid crystal element) according to the image signal output from the image processing unit 101.

The backlight driving unit 103 controls the luminescent brightness of the backlight unit 105 (each LED) according to the image signal output from the image processing unit 101. For example, the backlight driving unit 103 performs a local dimming control that makes luminescent brightness of an area having a low gradation value (dark pixel value) be lower than that of an area having a high gradation value (bright pixel value). The control is performed on the LED that corresponds to the first display area 11d (the area in which the image based on the input image signal is displayed). The luminescent brightness of an LED corresponding to the second display area 11e (the area in which the patch image is displayed) is controlled to be the predetermined luminescent brightness.

By the foregoing control, the light from the backlight unit 105 is irradiated to the display unit 104, the image based on the input image signal is displayed in the first display area 11d of the screen, and the patch image is displayed in the second display area 11e.

The sensor unit 106 outputs the signal (measured values) according to the brightness and/or chromaticity of light incident to the light receiving surface.

The control unit 107 controls the image processing unit 101 based on the measured values of the sensor unit 106. Specifically, the image processing performed by the image processing unit 101 is controlled so that the measured values become desired values. More specifically, parameter values used in the image processing are changed. As a result, it is possible to display the image based on the input image signal at the desired brightness and/or chromaticity.

Note that the control unit 107 may write, in the memory unit 108, the parameter values (the parameter values used in the image processing) determined based on the measured values. And the image processing unit 101 may read the parameter values from the memory unit 108 when the next image processing is performed.

In the first embodiment, the measuring surface facing the screen is disposed along an edge of the screen and a length of the measuring surface in a direction along the edge of the screen is approximately the same as the length of the edge of the screen. With this configuration, it is possible to measure the light from a wide area of the screen. Specifically, it is possible to measure light from the area in which the length in a direction along an edge of the screen is approximately the same as the length of the edge of the screen, as an area along the edge of the screen. As a result, it is possible to prevent the more undesirable measured values according to the usage environment of the image display apparatus, and the like, from being obtained and to measure the light from the screen with high precision (thereby, it is possible to realize calibration processing with excellent precision). Specifically, even when undesirable light is emitted from the local area of the screen due to dust sticking to the screen, and the like, an effect of light on the measured values may be reduced. More specifically, according to the first embodiment, a value that indicates a sum of light incident to each position of the measuring surface is obtained as a measured value. For this reason, even though undesirable light is incident to the local area of the measuring surface, desired light is incident to other areas of the measuring surface, such that the effect of the undesirable light on the measured values may be reduced.

In addition, in the first embodiment, the area of the screen is divided into the first display area and the second display area. Further, the front sensor unit is disposed so that the measuring surface faces the second display area. With such a configuration, it is possible to measure the light from the screen without hindering the viewing of any image.

Note that, in the first embodiment, even though the image display apparatus is configured to perform calibration processing, the calibration processing (for example, the calculation of the parameter values of the image processing) may be performed in another apparatus.

Also note that, even though the first embodiment describes the example of the case in which the display panel is configured of the liquid crystal panel and the backlight, the display panel is not limited thereto. The display panel may be a plasma display panel, an organic electroluminescence (EL) display panel, and the like.

Further, an external light sensor for measuring external light (environmental light) may be disposed in the exterior case (bezel). The calibration processing may be performed in consideration of the effect of the environmental light on the brightness and/or chromaticity of the displayed image.

Further, a spectral sensor may be used as the photometric sensor.

Also note that, even though the first embodiment describes that the measuring surface is disposed along a long length direction (horizontal direction) of the screen of the image display apparatus, the measuring surface may be disposed along a short length direction (vertical direction) of the screen.

Further, a temperature sensor which measures temperature in the vicinity of the photometric sensor may be disposed. The measured values of the photometric sensor may be calibrated to reduce the effect of temperature.

Further, a size of the measuring surface may not be equal to the second display area. The size of the measuring surface may be larger or smaller than that of the second display area. The measuring surface may entirely cover the second display area or partially cover the second display area.

Also note that, even though the first embodiment describes a configuration in which the front sensor unit has the light guide plate and the photometric sensor, the configuration of the front sensor unit is not limited thereto. The front sensor unit may have a plurality of photometric sensors that is arranged on the screen.

The incidence surface, the light emitting surface, or both surfaces of the light guide plate may be provided with a plurality of first projections and depressions (minute projections and depressions) (may be subjected to surface texturing). As a result, it is possible to increase a quantity of light on the light receiving surface of the photometric sensor.

In addition, the front sensor unit is preferably disposed at a side at which the driving IC and the flexible wiring board of the display panel are not disposed. As a result, it is possible to reduce the effect on the measured values (the measured values of the front sensor unit) due to the change in temperature of the driving IC and the flexible wiring board. A non-flexible wiring board (a circuit board which is not flexible) may be used instead of the flexible wiring board.

Further, the incidence surface of the light guide plate is preferably provided with a plurality of second projections and depressions which have a smaller pitch as being farther away from a sensor. The light incidence surface of the light guide plate is preferably provided with a plurality of third projections and depressions which have a longer distance between an apex portion of a protruded portion and a deepest portion of a depressed portion as being farther away from the sensor. It is preferable that a length of the incidence surface of the light guide plate in a direction vertical to a direction along an edge of the screen in a surface parallel to the screen is set to be longer as being farther away from the sensor. It is possible to suppress a variation in loss until light reaches the light emitting surface of light incident to each position of the incidence surface by adopting at least any one of the three configurations.

Note that the first to third projections and depressions may be the same.

Second Embodiment

Hereinafter, an image display apparatus according to a second embodiment of the present invention will be described with reference to some drawings. Note that a description of the same configuration as that of the first embodiment will not be repeated.

Figure 7:
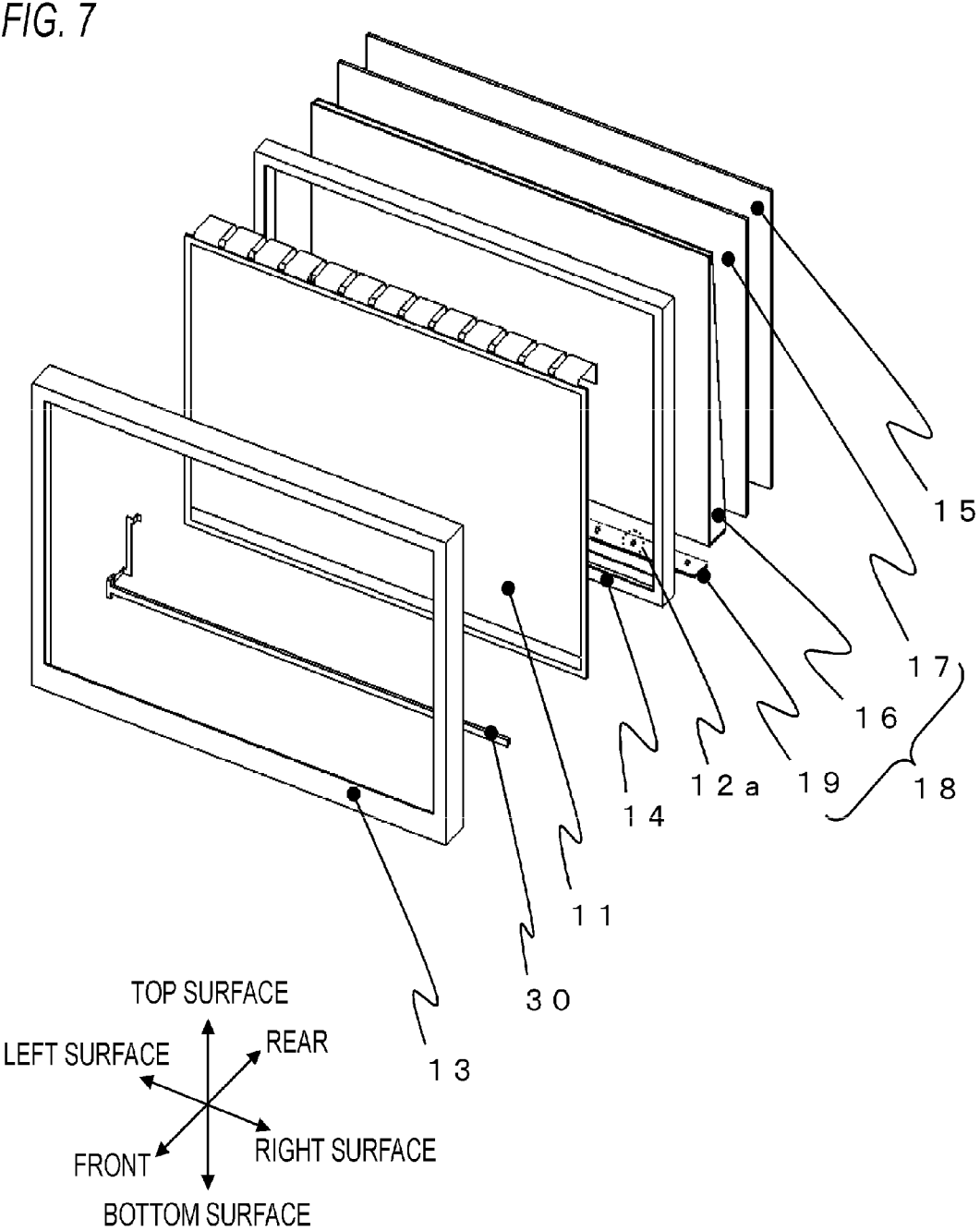
FIG. 7 is an exploded view of a display module according to a second embodiment.

A structure of the image display apparatus and a display module according to the second embodiment will be described with reference to FIG. 7. FIG. 7 is an exploded view of the display module according to the second embodiment.

The display module according to the second embodiment has an edge light type backlight board 18 in which a plurality of light sources (LEDs 12a) is disposed along an edge of the screen, instead of the backlight board 12 according to the first embodiment. In an example of FIG. 7, the backlight board 18 includes an LED board 19 on which the plurality of LEDs 12a is mounted, a BL light guide plate 16, and a reflective sheet 17. The BL light guide plate 16 includes an incidence surface (BL incidence surface), a light emitting surface (BL light emitting surface), and a reflecting surface (BL reflecting surface). The BL incidence surface, which is a surface of the bottom side, is a surface to which light from the LED board 19 is incident. The BL light emitting surface, which is a surface of a front side, is a surface that faces the rear of a liquid crystal panel 11 and emits light incident from the LED board 19. The BL reflecting surface, which is a surface of a rear side of the LED board 19, is a surface that reflects light incident to the BL incidence surface toward the BL light emitting surface. The BL reflecting surface is formed by attaching the reflective sheet 17 to the BL light guide plate 16. The reflective sheet 17 is a sheet serving to reflect light. The LED board 19 is provided on the bottom side of the BL light guide plate 16.

In the second embodiment, a front sensor unit is disposed so that a measuring surface is disposed along an edge of the screen of a side (bottom side) on which the LEDs 12a are disposed. Further, the second display area of the screen is an area according to the edge of the screen of the side at which the LEDs 12a are disposed.

Figure 9:
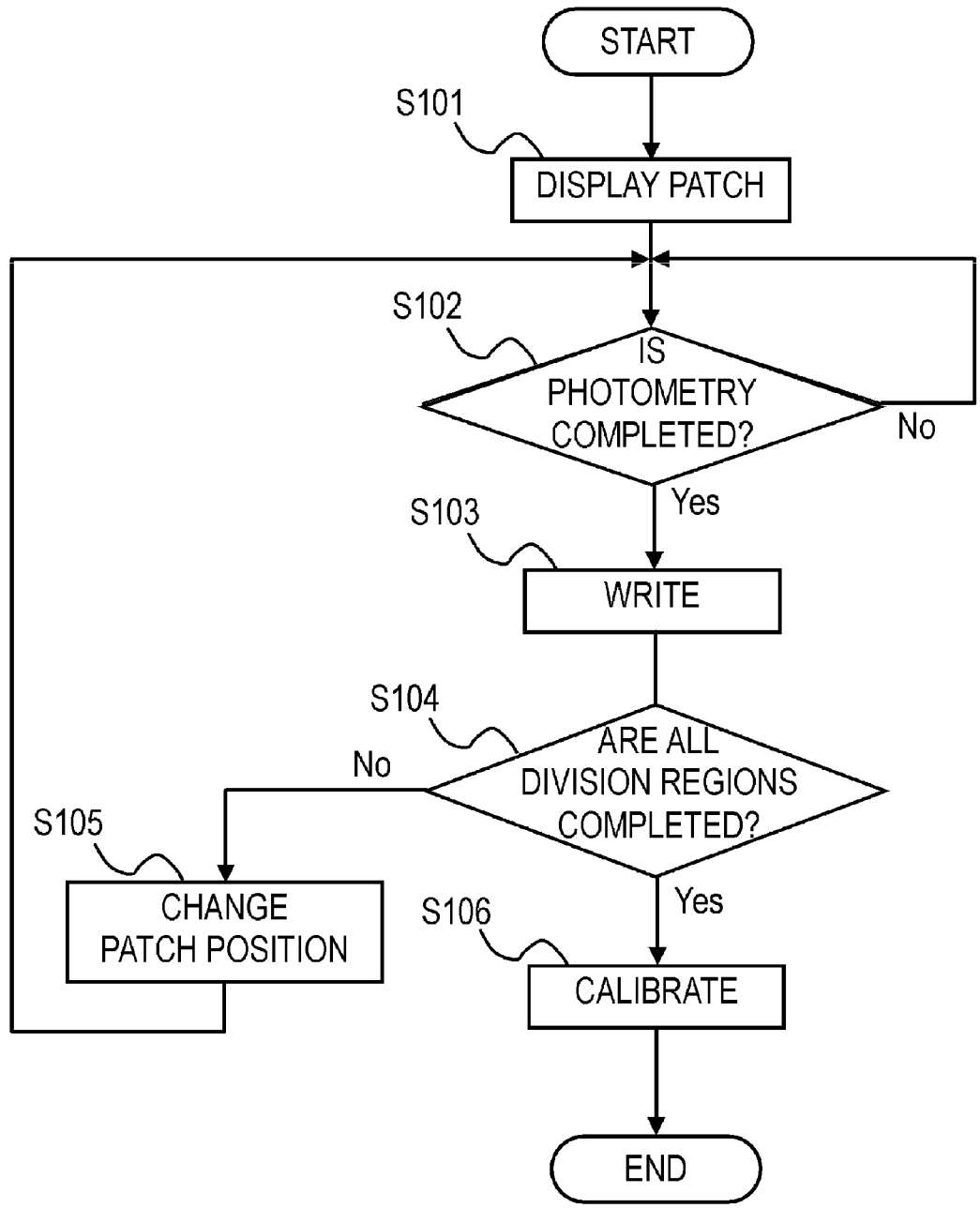
FIG. 9 is a flow chart illustrating a sequence of calibration processing according to the second embodiment.

Next, the calibration processing by the image display apparatus according to the second embodiment will be described with reference to FIGS. 8 and 9. FIG. 8 is a front view of the liquid crystal panel 11 illustrating a patch image displayed at the time of performing the calibration processing according to the second embodiment. FIG. 9 is a flow chart illustrating a sequence of the calibration processing. The calibration processing may be performed by the same method as in the first embodiment.

First, an image processing unit 101 adds a patch image signal to an input image signal such that the patch image is displayed in an area of a part of the screen (an area of a part of the second display area 11e) (S101). In the second embodiment, a white patch image, of which the length in a direction along an edge (an edge of a screen) of a side at which a front sensor unit 30 is disposed is shorter than the second display area 11e, is displayed. The patch image is displayed at any one of a plurality of predetermined positions within the second display area 11e. The plurality of predetermined positions is a plurality of positions arranged in a direction along the edge (the edge of the screen) of the side at which the front sensor unit 30 is disposed. In addition, in the second display area 11e, an area other than the area in which the patch image is displayed is displayed with a black image.

Next, the light from the screen is measured by the photometric sensor 31a (S102). In this case, the measured values represent light from the area in which the white patch image is displayed.

The measured values (the values obtained in S102) of the photometric sensor 31a is written in the memory unit 108 by the control unit 107.

Next, the control unit 107 determines whether the patch images are displayed at all the positions (S104).

When the patch images are not completely displayed at all the positions (No in S104), the control unit 107 orders the image processing unit 101 to change the positions at which the patch images are displayed (S105). Specifically, the control unit 107 orders the image processing unit 101 to display the patch image at the next position. In the second embodiment, it is considered that the positions at which the patch images are displayed are sequentially switched from a position at one end to a position at the other end in a direction along the edge (the edge of the screen) of the side at which the front sensor unit 30 is disposed. In an example of FIG. 8, the positions at which the patch images are displayed are sequentially switched from a position at a left end to a position at a right end. Further, the switching sequence of the display positions is not limited thereto. For example, the display positions may be randomly switched.

When the patch images are completely displayed at all the positions (Yes in S104), the control unit 107 reads the measured values at all the positions from the memory unit 108. Further, the control unit 107 controls the image processing unit 101 based on a sum of the read measured values (the parameter values used for the image processing are changed (calibrated)) (S106).

Figure 10A:
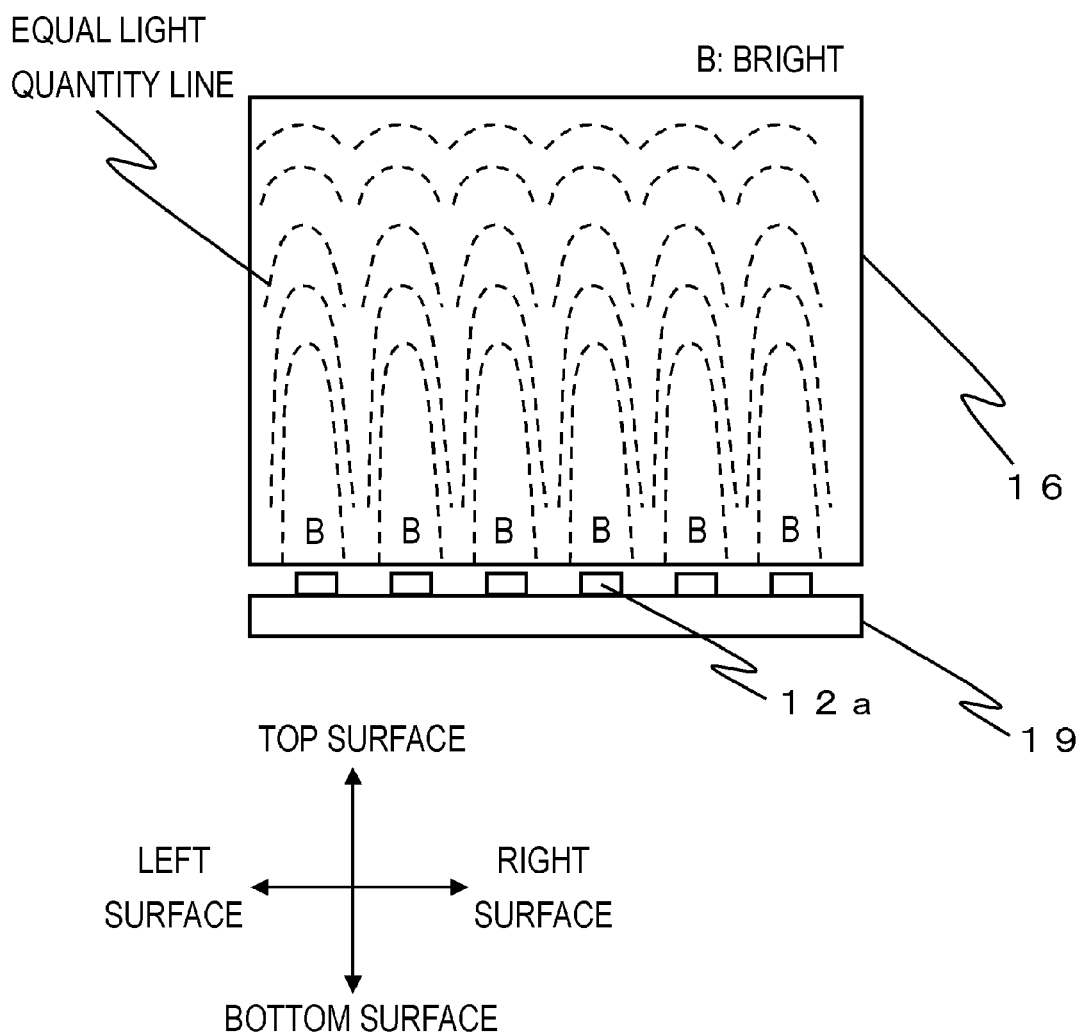
Figure 11A:
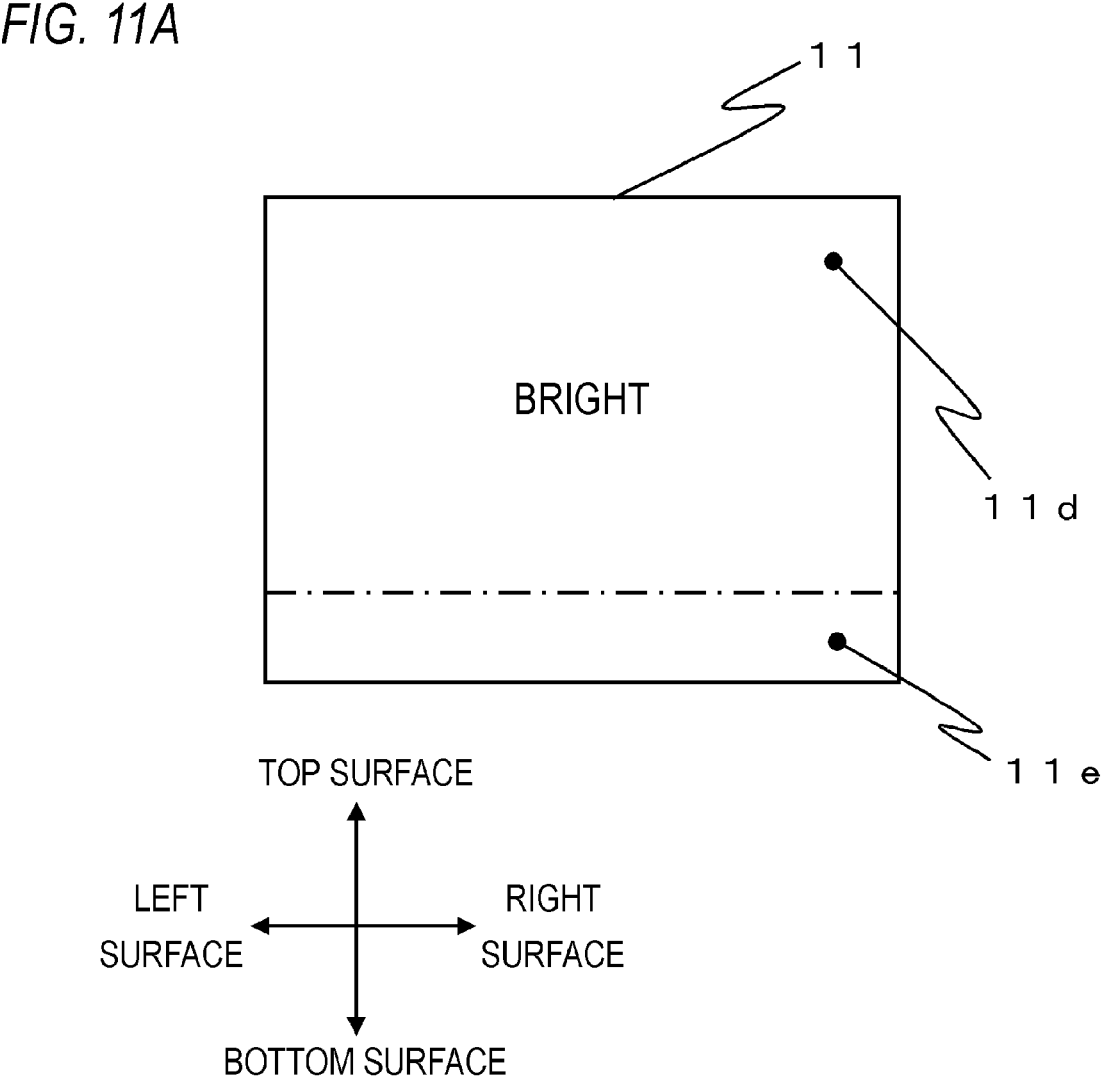

Further, according to the configuration of the second embodiment, an area in which undesirable light is generated at the time of performing the calibration processing, such as an area to which foreign materials stick, an area in which the LEDs 12a are deteriorated, and the like, can be specified. Hereinafter, this will be described in detail with reference to FIGS. 10A, 10B, 11A, and 11B. FIGS. 10A and 10B illustrate quantities of light of each LED 12a. FIG. 10A illustrates an example of the case in which the quantities of light of respective LEDs 12a are uniform, and FIG. 10B illustrates an example of the case in which those are not uniform. FIGS. 11A and 11B illustrate the brightness distribution on the screen when a uniform image is displayed. FIG. 11A illustrates an example of the case in which the quantities of light of respective LEDs 12a are uniform, and FIG. 11B illustrates an example of the case in which those are not uniform.

In the edge light type backlight that is using a point light source such as the LED 12a, the light from the respective LEDs 12a is combined one another in the BL light guide plate 16 so as to be emitted from the BL light emitting surface. The point light source such as the LED 12a has directivity. For this reason, as illustrated in FIGS. 10A and 10B, the light from the LED 12a is not much diffused in the vicinity of the LEDs 12a (broken lines of FIGS. 10A and 10B represent the quantities of light of respective LEDs 12a and are equal light quantity lines obtained by connecting points having the same quantities of light). As a result, light relatively more including the light from the LED 12a is emitted from an area in the vicinity of the LED 12a of the BL light emitting surface. Further, the relative amount of light from another LED 12a included in the light emitted from the BL light emitting surface increases as the distance from the LED 12a increases.

As illustrated in FIG. 10A, when the quantities of light from all the LEDs 12a are the same as each other, the brightness on the screen is uniform when a uniform image is displayed as illustrated in FIG. 11A. In addition, the measured values (the measured values of the photometric sensor 31a) for respective positions are also uniform.

Meanwhile, as illustrated in FIG. 10B, when the quantities of light of some of the LEDs 12a are different from the quantities of light of other LEDs 12a, the brightness on the screen is not uniform when a uniform image is displayed, as illustrated in FIG. 11B. In addition, the measured values (the measured values of the photometric sensor 31a) for respective positions are also non-uniform. Specifically, when the quantities of light of some of the LEDs 12a (deteriorated LEDs) are lower than those of other LEDs 12a due to the deterioration thereof, and the like, the brightness of the areas in the vicinity of the deteriorated LEDs is lower than that of other areas. In addition, in the second embodiment, the measuring surface of the front sensor unit is disposed along an edge of the screen of the side at which the LEDs 12a are disposed. For this reason, when the patch image is displayed at a position near the deteriorated LED, a measured value largely different from the measured value obtained by displaying the patch image at a position faraway from the deteriorated LED is obtained.

The non-uniform measured value as described above is obtained even when there is a place at which the undesirable light is generated at the time of performing the calibration processing, such as when dust sticks to a part of the second display area, and the like.

For this reason, according to the configuration of the second embodiment, it may be determined whether there is an area at which undesirable light is generated at the time of performing the calibration processing by determining whether the measured values for respective positions are uniform. It may be determined whether the measured values for respective positions are uniform by, for example, determining whether the measured value having the difference from the measured values of other positions that is above a predetermined value is present in the measured values for respective positions. Further, it is possible to specify the area in which the undesirable light is generated at the time of performing the calibration processing by specifying a position at which the patch image having the measured value largely different from the measured values at other positions is displayed.

At the time of performing the calibration processing, after the area in which the undesirable light is generated is specified at the time of performing the calibration processing by the foregoing method, the parameters of the image processing may be determined based on the measured value obtained by displaying the patch image in an area other than the specified area.

When the non-uniform measured values are generated due to the deterioration in the light sources of the backlight, the brightness distribution (or, a distribution inverting the distribution) of light from the BL light emitting surface may be calculated based on the non-uniform measured values. Further, the image processing that reduces the effect on the image of the non-uniform light from the BL light emitting surface may be performed on the image signal using the calculated distribution.

When each light source can be driven independently, the driving signals (driving voltage (current)) of respective light sources may be controlled so that the brightness distribution of light from the BL light emitting surface is uniform.

Note that, even though the second embodiment describes an example of the case in which the plurality of light sources is disposed along an edge (an edge of the bottom side) of the screen, the plurality of light sources may be disposed along multi edges of the screen. In this case, the front sensor units are preferably disposed for respective edges at which the light sources are disposed.

Further, the light source is not limited to the LED. The light source may be a cold cathode tube, and the like.

Third Embodiment

Hereinafter, an image display apparatus according to a third embodiment of the present invention will be described with reference to some drawings. Further, a description of the same configuration as that of the first embodiment will not be repeated.

Figure 12:
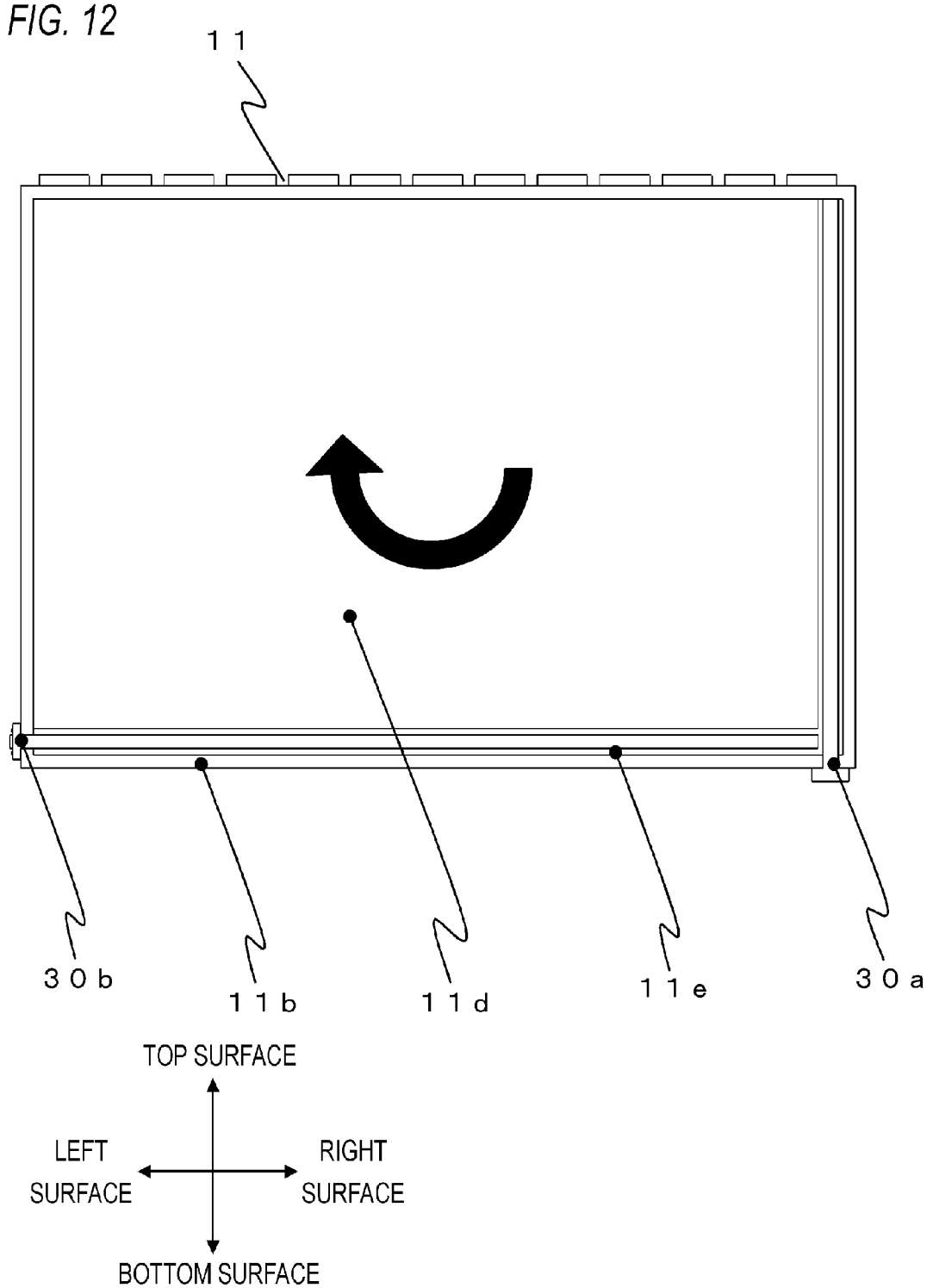
FIG. 12 is a front view of a liquid crystal panel according to a third embodiment.

A structure of the image display apparatus and a display module according to the third embodiment will be described with reference to FIG. 12. FIG. 12 is a front view of a liquid crystal panel 11 illustrating a front sensor unit according to the third embodiment.

A general structure of the display panel according to the third embodiment is the same as that of the first embodiment. Specifically, the display panel according to the third embodiment has the liquid crystal panel 11 and a backlight board 12 that is a direct type backlight in which a plurality of light sources is disposed (at an approximately equidistance) at the rear side of the liquid crystal panel 11. Further, the display panel according to the third embodiment can be rotated about an axis in a direction vertical to the screen. Specifically, an image display apparatus 1 is supported by a stand 60 with which the screen can rotate in the direction shown by the arrow in FIG. 12.

In the third embodiment, the image display apparatus has two front sensor units 30a and 30b (first photometric unit and second photometric unit). The measuring surface of the front sensor unit 30a, that is the first photometric unit, is disposed along a first edge that is one of four edges of the screen. The measuring surface of the front sensor unit 30b, that is a second photometric unit is disposed along a second edge that is one of the four edges of the screen, and is an edge vertical to the first edge. Further, a second display area 11e of the screen is an area having an L shape or a reverse L shape that face the measuring surfaces of the two front sensor units 30a and 30b. In an example of FIG. 12, the measuring surface (the incidence surface of a light guide plate) of the front sensor unit 30a is disposed along an edge at the right surface of the screen. In addition, the tip of the bottom side of the light guide plate (first light guide plate) of the front sensor unit 30a is provided with a photometric sensor (first sensor). The measuring surface (the incidence surface of the light guide plate) of the front sensor unit 30b is disposed along an edge at the bottom surface of the screen. In addition, the tip at the left surface of the light guide plate (second light guide plate) of the front sensor unit 30b is provided with a photometric sensor (second sensor).

The position of the measuring surface or the photometric sensor is not limited to the foregoing position. For example, the photometric sensors of the two front sensor units may be provided at positions close to each other (for example, at the lower right of the screen). Specifically, the tip at the bottom surface of the light guide plate of the front sensor unit 30a may be provided with the photometric sensor, and the tip at the right surface of the light guide plate of the front sensor unit 30b may be provided with the photometric sensor. Further, the front sensor unit may be provided so that the measuring surface is disposed along the edge at the top surface or the left surface of the screen.

Further, the second display area 11e of the screen may be divided into two areas, that is, the area facing the measuring surface of the front sensor unit 30a and the area facing the measuring surface of the front sensor unit 30b.

Next, the effect of the third embodiment will be described with reference to FIGS. 13A and 13B. FIGS. 13A and 13B are views illustrating the brightness distribution on the screen when a uniform image is displayed. FIG. 13A is an example of the case in which the length direction of the screen is a horizontal direction, and FIG. 13B is an example of the case in which the length direction of the screen is a vertical direction.

The functional components of the image display apparatus according to the third embodiment are the same as those in first and second embodiments (FIG. 6) and the method of the calibration processing is the same as that in the second embodiment. However, in the third embodiment, since the second display area 11e has the L shape or the reverse L shape, the position of the patch image is changed in two directions of a horizontal direction and a vertical direction. Specifically, the white patch images are sequentially displayed at the plurality of positions including the plurality of first positions and the plurality of second positions, and the measurement is performed by the photometric sensor. The plurality of first positions are a plurality of positions arranged in a direction along an edge (an edge of the screen) of a side at which the front sensor unit 30a is provided, as the plurality of positions within the area that faces the measuring surface of the front sensor unit 30a in the second display area 11e. The second positions are a plurality of positions arranged in a direction along an edge (an edge of the screen) of a side at which the front sensor unit 30b is provided, as the plurality of positions within the area that faces the measuring surface of the front sensor unit 30b in the second display area 11e. In the third embodiment, the patch image is measured by the photometric sensor while moving in the L shape or the reverse L shape.

The measured value of each position may be a sum of the measured value of the photometric sensor of the front sensor unit 30a and the measured value of the photometric sensor of the front sensor unit 30b, or may be the measured value of any one of the photometric sensors of the front sensor units 30a and 30b. For example, the measured value of the first position may be the measured value of the photometric sensor of the front sensor unit 30a. The measured value of the second position may be the measured value of the photometric sensor of the front sensor unit 30b. When acquiring the measured value of the photometric sensor of the front sensor unit 30a as the measured value of the first position and acquiring the measured value of the photometric sensor of the front sensor unit 30b as the measured value of the second position, the patch images may be simultaneously displayed at the first and second positions.

The inside of the display module 10 is in an airtight state, and heat generated at the LEDs 12a is released via a chassis 15 that is provided at the rear side of the backlight board 12. When the LEDs 12a are disposed at the rear of liquid crystal panel 11 at an equidistance, the temperature distribution within the display module 10 (within the display panel), on a surface parallel to the screen, represents the highest temperature at a center (a center in a direction between the left surface and the right surface) of a top surface and represents a lower temperature as approaching the end of the bottom surface of the display module 10.

The LEDs 12a have temperature characteristics in which the emission efficiency reduces as the temperature increases. For this reason, the brightness distribution of light from the backlight board 12, on the surface parallel to the screen, is the darkest at the center of the top surface and is brighter as approaching the end of the bottom surface of the backlight board 12. As a result, when displaying a uniform image, as illustrated in FIGS. 13A and 13B, the brightness distribution on the screen is the darkest at the center of the top surface and is brighter as approaching the end of the bottom surface of the backlight board 12. As illustrated in FIGS. 13A and 13B, such brightness distribution may occur in both cases where the length direction of the screen is a horizontal direction and where the length direction of the screen is a vertical direction.

According to the third embodiment, in the both cases where the length direction of the screen is the horizontal direction and where the length direction of the screen is the vertical direction, the measuring surface of the front sensor unit is disposed along an edge in a vertical direction of the screen. The foregoing brightness distribution (or a distribution inverting the distribution) may be calculated from the measured values of the plurality of positions arranged along the edge in the vertical direction of the screen. Further, the image signal may be subjected to the image processing using the calculated distribution to reduce the effect of the non-uniform light from the backlight board 12 on the image.

When each light source can be driven independently, the driving signals (driving voltage (current)) of each light source may be controlled so that the brightness distribution of light from the backlight board 12 is uniform.

Note that, in the third embodiment, as illustrated in FIGS. 13A and 13B, when the screen of the display is rotated, the temperature distribution of the LEDs is not stabilized immediately after the rotation, and the brightness of the display surface is not stabilized, either. For this reason, the configuration in which the sensing starts after waiting for a predetermined time (time until the brightness of the display surface is stabilized) may be allowed. Alternatively, in this case, the configuration in which the sensor value immediately after the rotation is not used in the control may be allowed.

Further, the disposition of the sensor is not limited to the disposition of FIG. 12. For example, as illustrated in FIG. 14, the first light guide plate and the second light guide plate are formed to have an L shape, and in each light guide plate, the ends of sides at which the light guide plates are adjacent to each other are provided with light emitting surfaces. In other words, the first light guide plate and the second light guide plate have the L shapes so that the light emitting surfaces of the light guide plates are concentrated on one place. In an example of FIG. 14, the first light guide plate has the light emitting surface at the tip of the second light guide plate side and the second light guide plate has the light emitting surface at the tip of the first light guide plate side. Further, as illustrated in FIG. 14, the sensor is disposed at a predetermined angle so that the light receiving surface of the sensor receives the light from the first light guide plate and the second light guide plate. For example, the sensor is disposed so that the light receiving surface of the sensor faces the light emitting surface of the first light guide plate and the light emitting surface of the second light guide plate. With such a configuration, both of the light guided by the first light guide plate and the light guided by the second light guide plate may be sensed by one sensor. With the above configuration, only one sensor is used and therefore, the variation in the detected values between the sensors does not occur. As a result, the precision of the sensing is increased compared to the case where the plurality of sensors is used. Further, only one sensor is used and therefore, costs may be reduced.

Note that, in the case of the configuration as illustrated in FIG. 14, a reflective member of guiding (reflecting to the sensor side) the light from each light guide plate to the light receiving surface of the sensor may be separately formed, as illustrated in FIG. 15. With such a configuration, the precision of the sensing by the sensor may be more increased. The disposition angle of the reflective member may be a predetermined angle (fixed value) or may be changed in synchronization with the rotation of the screen so as to further increase the precision of the sensing.

Figure 16:
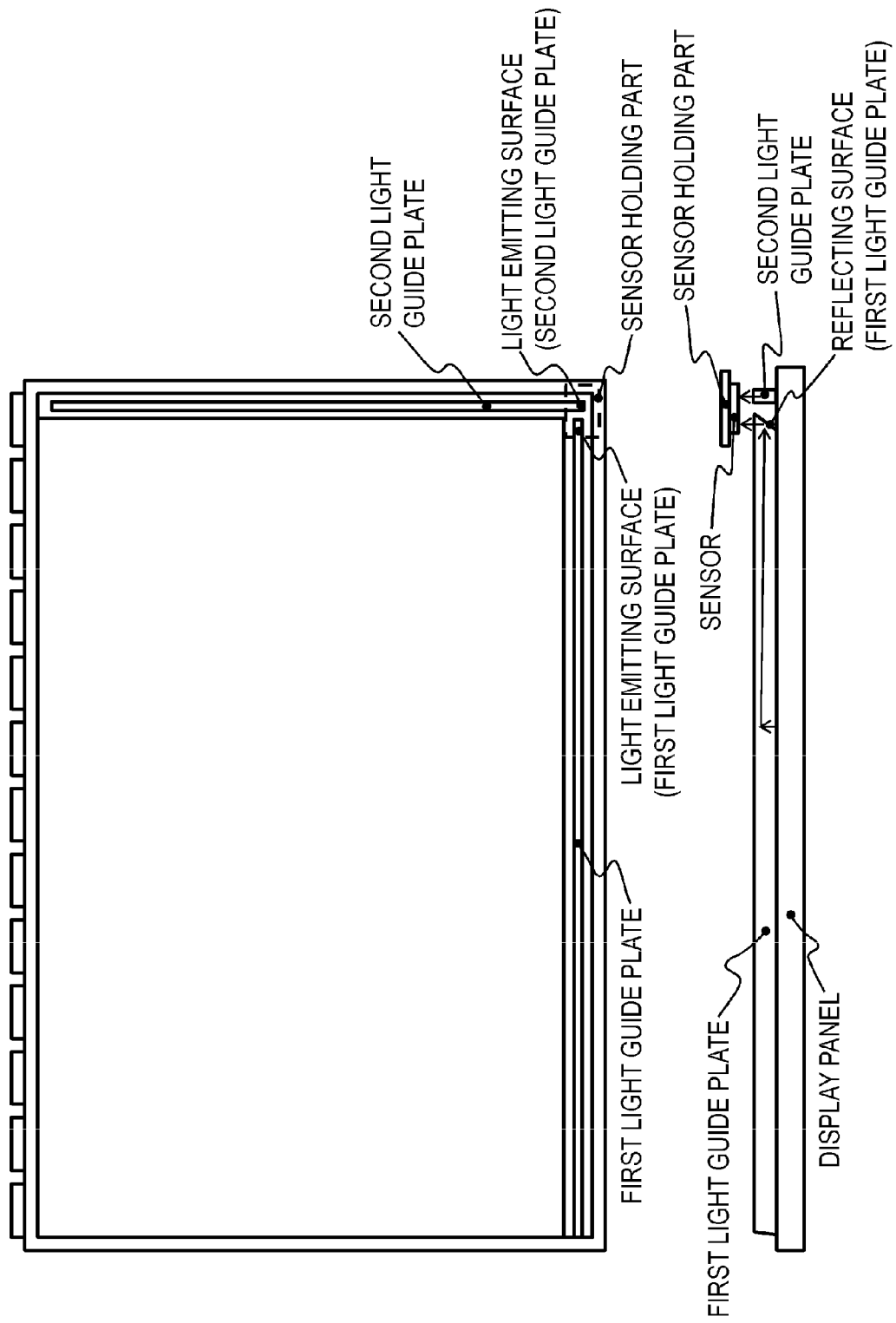
FIG. 16 is a schematic diagram illustrating still another liquid crystal panel according to the third embodiment.
Figure 17:
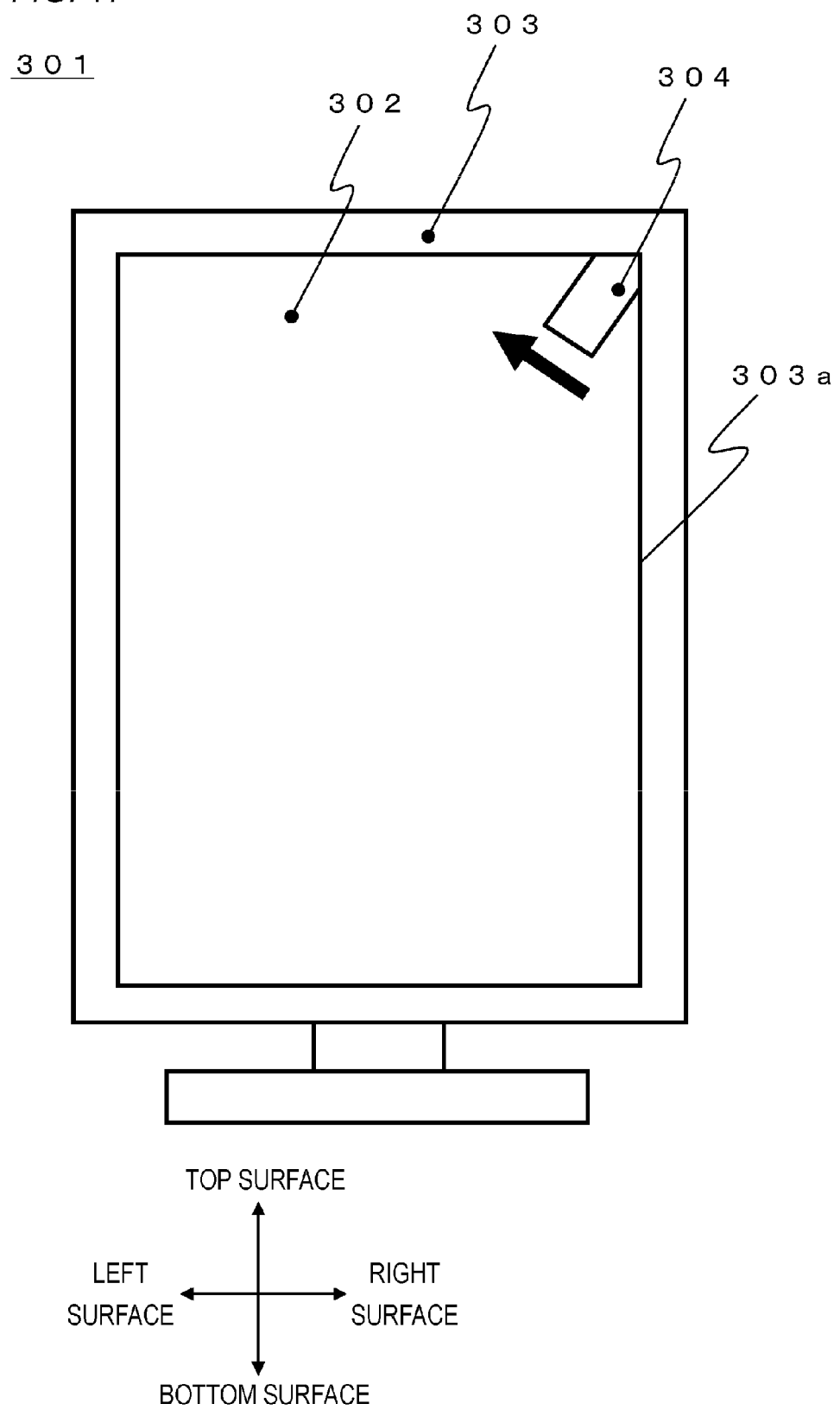
FIG. 17 is a front view of an image display apparatus according to the related art.

Further, the disposition configuration of the sensor is not limited to the foregoing description. For example, as illustrated in FIG. 16, one sensor is held by a sensor holding part. Specifically, the sensor may be held by the sensor holding part so that the light receiving surface faces the screen. In the case of the above configuration, the light emitting surfaces of the first light guide plate and the second light guide plate just need to face the light receiving surface. Further, the first light guide plate and the second light guide plate just need to have the reflecting surfaces that reflects the light incident from the screen toward the light emitting surfaces. Alternatively, the sensor may be disposed to face only the light emitting surface of either of the light guide plates. For example, the sensor holding part may be configured to move in parallel or rotate, and the like, in synchronization with the rotation of the display so that the light emitting surface facing the light receiving surface of the sensor is switched from the light emitting surface of one light guide plate to the light emitting surface of the other light guide plate. With these configurations, both the light guided by the first light guide plate and the light guided by the second light guide plate may be sensed by one sensor. Since only one sensor is used, the variation in the detected values between the sensors does not occur. As a result, the precision of the sensing is increased compared to the case where the plurality of sensors is used. Further, only one sensor is used and therefore, costs may be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-283560, filed on Dec. 26, 2011, and Japanese Patent Application No. 2012-257593, filed on Nov. 26, 2012, which are hereby incorporated by reference herein in their entirety.

What is claimed is:

1. An image display apparatus, comprising:
a display panel configured to display an image on a screen; and
a photometric unit configured to measure light incident from the screen,
wherein the photometric unit includes:
a sensor configured to measure the incident light; and
a light guide unit configured to guide the incident light to the sensor by refracting the incident light.

2. The image display apparatus according to claim 1, wherein
an area of the screen includes a first display area that is an area in which any image is displayed and a second display area which is adjacent to the first display area and on which a predetermined image is displayed, and
the light guide unit is provided to face the second display area of the screen.

3. The image display apparatus according to claim 1, wherein the light guide unit includes:
an incidence surface to which the light to be measured is incident; and
a light emitting surface emitting the light incident to the incidence surface to the outside.

4. The image display apparatus according to claim 3, wherein
the incidence surface is disposed along an edge of the screen, and
a length of the incidence surface in a direction along the edge of the screen is approximately the same as a length of the edge of the screen.

5. The image display apparatus according to claim 3, wherein the incidence surface, the light emitting surface, or both of these surfaces are provided with a plurality of first depressions and protrusions.

6. The image display apparatus according to claim 3, wherein the light guide unit further includes a reflecting surface that reflects the light incident to the incidence surface toward the light emitting surface.

7. The image display apparatus according to claim 3, wherein the incidence surface is provided with a plurality of second depressions and protrusions having a smaller pitch as being farther away from the sensor.

8. The image display apparatus according to claim 3, wherein the incidence surface is provided with a plurality of third projections and depressions having a longer distance between an apex portion of a protruded portion and a deepest portion of a depressed portion as being farther away from the sensor.

9. The image display apparatus according to claim 3, wherein
a diffusing agent is added inside the light guide unit, and
a concentration of the diffusing agent is set so as to be higher as the diffusing agent is farther away from the sensor.

10. The image display apparatus according to claim 3, wherein a length of the incidence surface in a direction vertical to a direction along the edge of the screen in a surface parallel to the screen is set to be longer as the incidence surface is farther away from the sensor.

11. The image display apparatus according to claim 3, wherein
the display panel includes a liquid crystal panel and an edge light type backlight in which a plurality of light sources are disposed along the edge of the screen, and
the incidence surface is disposed along an edge of the screen of a side at which the light sources are disposed.

12. The image display apparatus according to claim 3, wherein
the display panel includes a liquid crystal panel and a direct type backlight in which a plurality of light sources are disposed at a rear side of the liquid crystal panel, and
the photometric unit includes:
a first light guide unit in which a measuring surface is disposed along a first edge of the screen, and
a second light guide unit in which a measuring surface is disposed along a second edge that is an edge of the screen vertical to the first edge.

13. The image display apparatus according to claim 12, wherein
the photometric unit includes a first sensor and a second sensor,
the first light guide unit refracts the light incident from the screen and guides the refracted light to the first sensor, and
the second light guide unit refracts the light incident from the screen and guides the refracted light to the second sensor.

14. The image display apparatus according to claim 12, wherein the first light guide unit and the second light guide unit refract the light incident from the screen to guide the refracted light to the sensor.

15. The image display apparatus according to claim 14, wherein the sensor is disposed so that a light receiving surface faces a light emitting surface of the first light guide unit and a light emitting surface of the second light guide unit.

16. The image display apparatus according to claim 14, wherein the photometric unit includes a reflecting unit that reflects light emitted from the first light guide unit and light emitted from the second light guide unit toward the sensor.

17. The image display apparatus according to claim 14, wherein
the sensor is disposed so that the light receiving surface faces the screen,
the light emitting surfaces of the first light guide unit and the second light guide unit face the light receiving surface, and
the first light guide unit and the second light guide unit have reflecting surfaces that reflect the light incident from the screen toward the light emitting surfaces.

18. The image display apparatus according to claim 1, wherein the photometric unit is disposed at a side at which a driving IC and a circuit board of the display panel are not disposed.

19. The image display apparatus according to claim 1, wherein the light guide unit collects the incident light to the sensor.

* * * * *